US 8,232,967 B2

(12) United States Patent
Ozolins

(10) Patent No.: US 8,232,967 B2
(45) Date of Patent: Jul. 31, 2012

(54) COMPUTER KEYBOARD WITH PROCESSOR FOR AUDIO AND TELEPHONY FUNCTIONS

(75) Inventor: Helmars E. Ozolins, Orient, NY (US)

(73) Assignee: Bloomberg Finance L.P., New York, NY (US)

( * ) Notice: Subject to any disclaimer, the term of this patent is extended or adjusted under 35 U.S.C. 154(b) by 1826 days.

(21) Appl. No.: 11/351,426

(22) Filed: Feb. 9, 2006

(65) Prior Publication Data

US 2006/0209028 A1    Sep. 21, 2006

Related U.S. Application Data

(63) Continuation of application No. 10/301,117, filed on Nov. 21, 2002, now Pat. No. 7,046,234.

(51) Int. Cl.
*G09G 5/00* (2006.01)
(52) U.S. Cl. ........................................ 345/168; 345/169
(58) Field of Classification Search .......... 345/156–172; 382/115–116
See application file for complete search history.

(56) References Cited

U.S. PATENT DOCUMENTS

| | | |
|---|---|---|
| 4,503,288 A | 3/1985 | Kessler |
| 4,533,791 A | 8/1985 | Read et al. |
| 4,736,407 A | 4/1988 | Dumas |
| D295,747 S | 5/1988 | Grange et al. |
| 4,759,053 A | 7/1988 | Satomi et al. |
| 4,829,559 A | 5/1989 | Izawa et al. |
| 4,839,919 A | 6/1989 | Borges et al. |
| 4,860,342 A | 8/1989 | Danner |
| 4,864,601 A | 9/1989 | Berry |
| 4,873,715 A | 10/1989 | Shibata |
| 4,878,242 A | 10/1989 | Springer et al. |
| D311,171 S | 10/1990 | Santer |
| 5,181,029 A | 1/1993 | Kim |
| 5,280,283 A | 1/1994 | Raasch et al. |

(Continued)

FOREIGN PATENT DOCUMENTS

EP    0 555 560 B1    8/1986

(Continued)

OTHER PUBLICATIONS

Lucent Technologies Bell Labs Innovations, T8301/T8302 *Phone-On-A-Chip* IP Solution, Product Brief, Mar. 2000.

(Continued)

*Primary Examiner* — Alexander Eisen
*Assistant Examiner* — Nelson Lam
(74) *Attorney, Agent, or Firm* — Frank J. DeRosa; Richard F. Kurz; Frommer Lawrence & Haug LLP

(57) ABSTRACT

A computer keyboard provides for one or more of processing, interfacing, input/output control with respect to the computer and/or one or more devices coupled to the keyboard, and/or for control of one or more devices coupled to the keyboard. The keyboard comprises at least one processor, and may also include one or more busses and/or other devices, that, individually in cooperation, perform such functions. In one embodiment, the processor receives telephony signals from the computer and provides telephony signals to the computer, performing the processing necessary to support telephony functions such as conversion of audio signals. Audio signals from computer sound cards and other audio signal sources may be mixed with telephony signals in keyboards according to the invention. Displays and associated input devices incorporated by the keyboard are provided to control telephony and other keyboard processor functions.

3 Claims, 31 Drawing Sheets

U.S. PATENT DOCUMENTS

| Patent No. | | Date | Inventor | Ref |
|---|---|---|---|---|
| 5,283,638 | A | 2/1994 | Engberg et al. | |
| 5,283,819 | A | 2/1994 | Glick et al. | |
| 5,375,165 | A | 12/1994 | Haber et al. | |
| 5,642,110 | A | 6/1997 | Raasch et al. | |
| 5,717,430 | A | 2/1998 | Copland et al. | |
| 5,764,789 | A * | 6/1998 | Pare et al. | 382/115 |
| 5,787,152 | A | 7/1998 | Freadman | |
| 5,790,644 | A | 8/1998 | Kikinis | |
| 5,825,871 | A | 10/1998 | Mark | |
| 5,892,502 | A | 4/1999 | Hiller | |
| 5,892,503 | A | 4/1999 | Kim | |
| 5,930,804 | A * | 7/1999 | Yu et al. | 1/1 |
| 5,935,244 | A * | 8/1999 | Swamy et al. | 726/9 |
| 5,963,679 | A * | 10/1999 | Setlak | 382/312 |
| 6,005,496 | A * | 12/1999 | Hargreaves et al. | 341/22 |
| 6,069,970 | A * | 5/2000 | Salatino et al. | 382/124 |
| 6,145,029 | A | 11/2000 | Deschepper et al. | |
| 6,215,420 | B1 | 4/2001 | Harrison et al. | |
| 6,249,825 | B1 | 6/2001 | Sartore et al. | |
| 6,256,020 | B1 | 7/2001 | Pabon et al. | |
| 6,278,442 | B1 * | 8/2001 | Griffin et al. | 345/169 |
| 6,282,304 | B1 | 8/2001 | Novikov et al. | |
| 6,307,921 | B1 | 10/2001 | Engelke et al. | |
| 6,315,582 | B1 | 11/2001 | Nishio et al. | |
| 6,317,061 | B1 | 11/2001 | Batra et al. | |
| 6,317,544 | B1 | 11/2001 | Diehl et al. | |
| 6,320,974 | B1 | 11/2001 | Glaze et al. | |
| 6,334,160 | B1 | 12/2001 | Emmert et al. | |
| 6,356,968 | B1 | 3/2002 | Kishon | |
| 6,366,951 | B1 | 4/2002 | Schmidt | |
| 6,396,849 | B1 | 5/2002 | Sarkissian et al. | |
| 6,401,030 | B1 | 6/2002 | Watanabe et al. | |
| 6,414,523 | B1 | 7/2002 | Yoshizaki | |
| 6,421,453 | B1 * | 7/2002 | Kanevsky et al. | 382/115 |
| 6,453,027 | B1 | 9/2002 | Kang et al. | |
| 6,671,808 | B1 * | 12/2003 | Abbott et al. | 726/4 |
| 6,871,242 | B1 * | 3/2005 | Ho-Lung et al. | 710/16 |
| 6,871,287 | B1 * | 3/2005 | Ellingson | 726/9 |
| 6,963,333 | B1 * | 11/2005 | Drummond et al. | 345/168 |
| 7,003,495 | B1 * | 2/2006 | Burger et al. | 705/50 |
| 7,197,168 | B2 * | 3/2007 | Russo | 382/125 |
| 2001/0011995 | A1 * | 8/2001 | Hinckley et al. | 345/156 |
| 2001/0013859 | A1 | 8/2001 | Roylance | |
| 2001/0043702 | A1 | 11/2001 | Elteto et al. | |
| 2002/0018682 | A1 * | 2/2002 | Camacho et al. | 400/472 |
| 2002/0091877 | A1 | 7/2002 | Karidis | |
| 2002/0097142 | A1 * | 7/2002 | Janiak et al. | 340/5.53 |
| 2003/0035568 | A1 * | 2/2003 | Mitev et al. | 382/124 |
| 2003/0051899 | A1 * | 3/2003 | Garabedian | 174/117 F |
| 2003/0115490 | A1 | 6/2003 | Russo et al. | 713/202 |
| 2003/0156740 | A1 * | 8/2003 | Siegel et al. | 382/115 |
| 2004/0064708 | A1 * | 4/2004 | Angelo et al. | 713/185 |
| 2004/0215966 | A1 * | 10/2004 | Elteto | 713/182 |
| 2004/0250084 | A1 * | 12/2004 | Hamid | 713/186 |
| 2005/0231485 | A1 * | 10/2005 | Jones et al. | 345/168 |

FOREIGN PATENT DOCUMENTS

| | | |
|---|---|---|
| GB | 2 288 368 A | 10/1995 |
| JP | 50-61583 | 5/1975 |
| JP | 2002-312268 | 10/2002 |
| WO | WO 00/64129 | 10/2000 |

OTHER PUBLICATIONS

Lucent Technologies Bell Labs Innovations, DSP1627 *Digital Signal Processor*, Mar. 2000.

Lucent Technologies Bell Labs Innovations, T8301 *Internet Protocol Telephone Phone-On-A-Chip IP Solution DSP*, Dec. 2000.

Texas Instruments, *7-Port Hub for the Universal Serial Bus with Optional Serial Eeprom Interface*, Mar. 2000.

Panasonic, *Omnidirectional Electret Condenser Microphone Cartridge*.

Optrex Corporation, *LCD Module Technical Specification*, Mar. 16, 2001.

Agere Systems, T8302 *Internet Protocol Telephone Advanced RISC Machine (ARM)*, Jul. 2001.

* cited by examiner

COMPUTER KEYBOARD WITH PROCESSOR FOR AUDIO AND TELEPHONY FUNCTIONS

CROSS-REFERENCE TO RELATED APPLICATIONS

This application is a continuation of and claims the benefit of U.S. patent application Ser. No. 10/301,117 filed Nov. 21, 2002, now U.S. Pat. No. 7,046,234 titled "COMPUTER KEYBOARD WITH PROCESSOR FOR AUDIO AND TELEPHONY FUNCTIONS," which is hereby incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention relates generally to input and output devices for computers. In particular, the invention relates to computer keyboards incorporating. one or more processors and providing input to and processing output from a computer, and for providing one or more of input/out, interface and control with respect to one or more devices coupled to the keyboard.

SUMMARY OF THE INVENTION

The invention provides a computer keyboard, for use with a computer, that provides for one or more of processing, interfacing, input/output control with respect to the computer and/or one or more devices coupled to the keyboard, and/or for control of one or more devices coupled to the keyboard. The inventive computer keyboard comprises at least one processor, and may also include one or more busses and/or other devices, that, individually or in any degree of cooperation, perform such functions.

Keyboards according to the invention provide local processing, e.g., of audio and telephony signals and input, output, and command operations, thereby reducing the processing otherwise needed to be performed by a computer coupled to the keyboard.

In one embodiment, the at least one processor receives telephony signals from the computer and provides telephony signals to the computer, performing the processing necessary to support telephony functions such as conversion of audio signals (e.g., microphone signals) to telephony signals and conversion of telephony signals to audio signals (e.g., analog audio signals for a speaker or speakers). In the preferred embodiment, the at least one processor performs other telephony functions such as ring, off-hook, etc. Computers typically include a sound card or other means for providing digital and/or analog audio signals that are suitable for driving a speaker or speakers, without or without further processing and/or amplification. The inventive keyboard includes means for supplying such signals to the same speaker or speakers as audio signals provided by the at least one processor.

The audio signals provided by the computer (computer audio signals) and the audio signals provided by the processor (processor audio signals) are preferably mixed prior to being supplied to one or more speakers coupled to the keyboard. Mixing may proceed on the basis of one or more mixing ratios and/or a priority basis. For example, when both computer audio signals and processor audio signals are provided, the mixing ratio may be, e.g., 2/3 processor audio and 1/3 computer audio, or any other ratio. Alternatively, when both computer audio signals and processor audio signals are provided, priority may be given to one of the signals, e.g., the computer audio signals are blocked and the processor audio signals are not attenuated (a ratio of 111 processor audio and 0/1 computer audio). Such means may also comprise an OR function, i.e., either signal unimpeded or both signals equally together. At the analog level, this may be accomplished simply by supplying analog computer audio signals and analog processor signals (either of which may be provided directly by the computer and the at least one processor or after D/A conversion) to an amplifier or one or more speakers with any desired or necessary interfacing or matching.

An embodiment of the invention provides a keyboard for use with a computer that provides audio and telephony output signals. The keyboard comprises an array of switches, means for providing signals relating to the state of the switches, one or more processors, and means for providing audio signals to a speaker from audio signals provided by the processor and audio signals provided by the computer.

The means for providing signals relating to the state of the switches is provided, for example, by a controller coupled to the switches. The signals may indicate, for example, whether individual switches are open or closed by pressing or releasing of keys coupled to the switches. Signals relating to the state of the switches are provided to a computer coupled to the keyboard, either directly by the controller or via the processor, and may be provided to the processor or any other device coupled to the keyboard. As is well understood by those skilled in the art, signals relating to the state of the switches may be interpreted by the computer and/or other processor(s) to represent different characters or symbols for constructing command statements and other input or data for the computer, or for data or instruction files processed thereby.

The processor(s) is programmed, comprises dedicated circuits, or otherwise provides functions related to telephony, such as the processing of audio and telephony signals, and may provide control and input/output functions for other data or devices, including the keyboard key array. Providing telephony functions includes, for example, processing telephony signals from a computer into audio signals and audio signals from a microphone into telephony signals, and optionally provision of ring, off-hook, call waiting, and other signals. For example, in a keyboard coupled to a computer used to provide IP or other packet-switched telephony, the processor(s) receives incoming telephony signals from the computer and provides any interpreting, packet assembly, buffering, storing, decoding, reformatting, and/or other processing required for delivering the signals in a desired format to speakers or other output devices. The processor(s) may also receive incoming signals from, for example, a microphone mounted on or otherwise coupled to the keyboard, and provide any addressing and other processing required for delivering the signals in a desired format to the computer, for transmission to other devices, such as for example another computer, linked to the first via a computer network.

Keyboard processor(s) according to the invention, may provide other functions. For example, keyboard processor(s) according to the invention may function in the role of controller for keyboard key switches, and perform the controller function of providing signals relating to the state of the switches to coupled computers or other devices. That is, such processors may comprise or replace the controller.

Processors may be used, for example, as one type of means for providing audio signals to a speaker from audio signals provided by the processor and audio signals provided by the computer. Any other combination of devices and/or circuitry suitable for processing signals in accordance with this disclosure will serve also.

Telephony functions provided by processors and other signal processing means according to the invention may comply with any suitable computer-supported telephony standards. For example, processors may process telephony signals in accordance with Voice Over Internet Protocols (VOIP), Internet Protocols (IP), or any other packet-switched telephony standards.

In embodiments of the invention used for network-based telephony, inventive keyboards may use or rely on computers or other devices coupled to the keyboards for connection to the network. For example, in an embodiment used with a workstation or personal computer attached to a network, the keyboard coupled to the computer provides telephony signals to the computer, as for example through an attached cable, a wireless device, or by any other suitable means, and the computer passes the signal, with or without further processing, to the network. Similarly, the computer provides telephony signals to the keyboard from the network.

Processors according to the invention may be general-purpose processors programmed for the purposes described herein, and other purposes; or specialized processors, such as for example processors comprising application specific integrated circuits (ASICs), programmed for any desired functions, and may include any memory or other feature required or useful in performing their function.

Keyboards according to the invention may comprise displays mounted to the keyboard and controlled by the at least one processor for displaying information related to telephony functions and/or other functions provided by the at least processor(s). Preferably such displays incorporate input devices comprising digitizers, such as touchpads or touchscreens, to provide control signals to the processor and optionally to other devices, such as attached computers or devices attached to or integrated with the keyboard. For example, a display incorporating an input device may provide an output related to one or more positions selected on the display by a user of the keyboard, the at least one processor being programmed to process the output of the input device to control at least one telephony, other audio, or other function performed by the at least one processor. Suitable displays comprise liquid crystal diode (LCD) screens and associated switches and circuits for controlling the processor(s) and other devices.

Displays suitable for use with keyboards according to the invention may be enabled to present multiple menus or interfaces, for use in controlling the processor(s) or other signal or data processing means, and/or other devices, in providing different functions or different aspects of a single function. For example, displays used for providing input to telephony processes provided by processors according to the invention may provide modes for reviewing and selecting intended addressees, or recipients for messages, completing and timing the sending, acknowledgement, and receipt of message, and other functions. For example, displayed lists of addressees may be presented on the display screen, the selection of one or more of which causes the processor to provide signals to a computer coupled to the keyboard with signals for establishing a connection with or delivering communications to the selected addressees. Selection of menus and items within menus, or the designation of icons, may be assisted through the provision of dedicated control switches such as buttons coupled to the displays, or through the use of touchpad type systems.

As discussed above, keyboards according to the invention may be coupled to computers which provide non-telephony audio signals as well as telephony signals. For example, computers may provide Voice Over Internet Protocol or other telephony signals received, for example, over a computer network such as the Internet. Such computers may also provide non-telephony signals such as voice e-mail, music, warning tones and aural indicators, and multimedia. For example, many computers use multimedia and/or sound cards suitable for use with operating systems such as Microsoft Windows, and provide a wide variety of non-telephony audio signals.

Means for providing audio signals to a speaker from audio signals provided by the processor, and audio signals provided by the computer, may include any devices and/or circuitry suitable for the purposes described herein. For example, such may comprise, for example, an audio circuit, conductors and/or connections between speaker(s), the processor(s), and any other required components, such as a bus connection to a coupling for receiving signals from or sending them to an attached computer. Such means may also comprise audio mixers and/or amplifiers, for mixing and amplifying telephony and other signals received from the processor and/or the computer. For example, preferred embodiments of the invention comprise audio circuits capable of mixing telephony signals originating from microphones, telephone handsets, and other devices attached to the keyboard with audio signals received from the computer, such as multimedia sound tracks or music, amplifying them, and providing them simultaneously to the speaker(s). For example, a telephony signal received by the keyboard from the computer may be mixed with music, voice, or other non-telephony signals received from the computer, such as for example audio signals processed by the computer's operating system. As discussed above, keyboards according to the invention may process both telephony and other signals by, for example, mixing one or more of each type of signal to provide simultaneous output to a speaker, or by interrupting the output or other processing of one type of signal for processing of another.

Keyboards according to the invention may comprise one or more speakers mounted to or otherwise coupled to the keyboard, as for example by providing a permanently mounted speaker in a keyboard body or chassis, or by providing external speakers coupled to the keyboard and the keyboard's audio circuit by plugs or jacks, or other removable connectors. In one embodiment, the keyboard is provided with a plurality of speakers, including one or more speakers mounted at the ends of the keyboard and facing outward, away from the center of the keyboard in a lateral direction. The keyboard may also be provided with one or more connectors and/or interrupt circuit(s) for coupling of a speaker headset(s).

Thus, means for providing audio signals to speakers from audio signals provided by the processor(s) may also comprise circuits, conductors and connectors for coupling external speakers to the keyboard.

Keyboards according to the invention may comprise one or more microphones mounted on or otherwise coupled to the keyboard. For example, stand-alone microphones may be coupled to the keyboard by jacks or other couplings; or microphones may be provided by telephone sets coupled to or integrated with the keyboard; or microphones may be mounted within the keyboard. In some embodiments the microphone is mounted in the keyboard, in proximity to a visual indicator device such as a light, the visual indicator device controlled by the keyboard processor(s) to provide a visual indication when audio signals from the microphone will be processed by the processor to provide the at least one function. Optionally, visual indicator devices may be used to aid users of the microphones in locating the microphones in the keyboards and to thereby improve the quality of audio signals received by the microphones and subsequent processing of the signals. Lights suitable for use as visual indicator devices in accordance with such embodiments include light-emitting diodes (LEDs) and other light-emitting devices. Visual indicator devices may surround, partially, or completely, the microphones with which they are associated, to aid users in locating the microphones.

Keyboards according to the invention may comprise both internally or integrally mounted microphones and speakers, and connectors and/or interrupt circuits for coupling of external microphones and speakers, so that when no external microphone or speaker is connected, the internal device(s) is used, and when an external device is connected the internal device is temporarily and automatically disabled.

Keyboards according to the invention may be combined with telephone handsets. For example, telephone handsets comprising at least microphones and speakers may be coupled to or mounted on the keyboard, or provided as integral portions of the keyboard, as for example by co-molding processes in forming the keyboards. Coupled telephone sets may include handset cradles mounted to or on the keyboard.

Keyboards according to the invention may comprise systems and devices for controlling access to computers coupled to the keyboards. For example, such keyboards my comprise biometric or other types of identification/authorization devices, such as fingerprint, voice, or retina comparison systems which generate data files used in the identification of a user's fingerprint, voice print, or retina for comparison to known data as a step in authorizing access by the user to a computer, its programs and data, and/or networks and other devices attached to or coupled to the keyboard. Fingerprint and/or other biometric sampling and comparison processes may be initiated, controlled, and processed by processors located within the keyboard or elsewhere, such as for example in a computer coupled to the keyboard, or connected to such a computer by a network or other communications link. Such sampling systems may be permanently or removably mounted within the keyboard. For example, a fingerprint sampling device may be included within a token such as a small, easily carryable, dockable casing, with an associate processor and suitable connectors, the token being removably attachable to the keyboard so that the fingerprint sampling device is accessible by a user seeking access to the computer when the token is attached to the keyboard.

Keyboards according to the invention may further comprise visual indicator devices to display a first indication when access to a computer has been granted to a user, based for example upon a comparison of previously-acquired fingerprint or other biometric data to data acquired from the user by the fingerprint sampling device, and to display a second indication when such access has been denied. For example, indicator lights such as LEDs are mounted to the keyboard, either as part of the access control system separately, and show red when access is denied, and green when access is authorized.

In an embodiment of a keyboard according to the invention, a fingerprint or other biometric sampling device for authorizing access by a user to a computer is permanently mounted to or removably coupled to the keyboard, and has a preferred orientation relative to a thumb, finger, or other digit or other sample source intended to be placed upon or in a specified relation to a surface of the fingerprint sampling device for sampling, the preferred orientation being definable by a principle axis. The sampling device is mounted on the keyboard at an edge of the keyboard which, preferably along the side of the keyboard, such that, for example, when the keyboard is in normal intended use by a user, the edge is substantially parallel to a forearm of the user, and is oriented on the keyboard at an angle so as to ease use of the device by users situated for use of the keyboard. For example, the device is mounted so as to align comfortably with the digit the user is intended to use in accessing the computer, when the digit is held in a natural or comfortable position compatible with the requirements of the sampling device. For example, the device is mounted to the keyboard such that the principal axis of the device is aligned at an angle of about 15 degrees to about 120 degrees from the edge of the keyboard. For a device intended to operate with a user's thumb, the device may be located on the side of the keyboard corresponding to the thumb the user intends to use, and angled at about 40 to about 90 degrees from the edge or the side of the keyboard.

Keyboards according to the invention which comprise fingerprint and other contact-type biometric sampling systems may also comprise surfaces composed at least partly of electrical conductive materials, the surfaces configured to as to improve an electrical connection between the fingerprint sampling system and one or more portions of a user's body. For example, improved electrical contact between the sampling device and portions of a user's hand may be used to improve the quality and reliability of fingerprint sampling systems. In a preferred configuration, such keyboards according to the invention comprise trimwork or other surface work of chrome or other metals or conductors, the conductor(s) located so as to contact a portion of a user's hand, for example, trimwork or other surface work on the end of the keyboard intended to be contacted by the hand including the sampled digit.

In some embodiments, the processor(s) provides additional or alternative-style telephony functions. Such functions may include, for example, "squawk" communications or other direct, sometimes one-way communications between computers. Among differences sometimes associated with such communications, relative to other telephony, are that normal "dialing" or addressing procedures are often abbreviated or eliminated, as for example by providing a reduced set of possible addressees, or by simplifying functions used in addressing communications. In addition, the process of notifying the intended addressee of the delivery or attempted delivery of the communication, and waiting for the addressee to respond or otherwise acknowledge prior to delivering the message, may be reduced or eliminated. For example, in traditional telephone protocols the presence of a message is announced by the "ringing" of the telephone, and the message is not delivered until the telephone is answered. In squawk communications the message may be delivered without prior announcement, and/or without requiring the recipient to indicate in any way that the recipient is ready to accept the message, for example by causing the message to be delivered via one or more speakers coupled to the user's keyboard without requiring recipient acknowledgment or authorization.

Packet-switched communications may be used in providing such communications. For example, a processor capable of providing telephony functions may receive a telephony signal, which may consist of the entirety of a single message; associate suitable address information with the message; store the message in memory, as for example a message buffer; and deliver the message to a computer coupled to the processor for further processing and delivery to the associated address as a packet of audio or telephony data, according to a packet switching protocol. This is particularly true where communications are one-way, as outside the context of a live conversation it may not be possible to detect brief delays in the delivery of messages.

In some embodiments of the invention audio signals received from a computer coupled to a keyboard according to the invention are provided to speakers coupled to the keyboard. Such audio signals may be mixed with and delivered to one or more speakers with telephony signals processed by a telephony processor in the keyboard, or they may be delivered sequentially to a single speaker or set of speakers, or simultaneously to separate speakers. In some embodiments in which such signals are mixed, keyboards according to the invention comprise audio circuits to couple the speakers and the processors; in such embodiments functions provided by the processors related to telephony may include providing audio signals to the audio circuit from telephony signals provided by the computer, and interrupting providing any other audio signals to the at least one speaker, as for example by providing a suitable command to an audio mixer or amplifier.

Processors, controllers, and other devices and systems comprised by keyboards according to the invention may be coupled by any suitable circuits, systems, or devices. In some embodiments coupling is accomplished through the use of busses, including for example one or more uniform serial busses (USB).

Some embodiments of the invention comprise pointing and other input/output devices coupled to the computer via the keyboards for providing input to or receiving output from a computer coupled to the keyboard. For example, some embodiments comprise a mouse, trackball, touchpad, or other pointing devices coupled to the keyboard and through the keyboard to a computer. In preferred embodiments of this type, the pointing device is coupled to the computer through more than one circuit or connection. For example, in a keyboard comprising a hub connection such as a USB hub, a pointing device is coupled to the computer both through the hub, and through a separate coupling to the computer, as for example an automatic switch. In such an embodiments the controller for the key switches, and the pointing device are selectively coupled to the computer by the hub, and the separate coupling. External pointing devices, removable and/or dockable identification or authorization tokens, and other devices may be connected to the keyboard by hard-wired or wireless connections, such as infrared, laser, or radio connection devices.

Keyboards according to the invention are intended for use in controlling and operating computers, including for example general-purpose computers and any other automatic data processing machines. Preferred keyboards provide arrays of alphanumeric keys, with or without additional numeric, mathematical calculation, and symbol and functional keys, special purpose keys or key groups provided for use in controlling computers in special functions, and any other keys and/or switches consistent with the disclosure herein. The invention may be implemented with a wide variety of key arrangements, including QWERTY, the Dvorak scheme, and others. Keyboards may comprise, for example, at least one separate key for each alphanumeric character, including for example shift keys to enable inputting of lower and upper case characters, and for any other desired editing or writing symbol or special function.

Processors, controllers, and other devices incorporated within or otherwise coupled to keyboards according to the invention may be powered by power supplies mounted to the keyboard or coupled to the keyboard via connectors or other devices. Power may be received direct from line, through batteries, through one or more computers coupled to the keyboard, or in any other suitable fashion.

Keyboards according to the invention may comprise memory for storing information used in controlling processors and other devices incorporated within or otherwise coupled to the keyboard, or for storing input and or output information generated or used by the keyboard or attached devices.

Additional aspects of the present invention will be apparent in view of the description which follows.

BRIEF DESCRIPTION OF THE FIGURES

The invention is illustrated in the figures of the accompanying drawings which are meant to be exemplary and not limiting, in which like references are intended to refer to like or corresponding parts.

DETAILED DESCRIPTION OF PREFERRED EMBODIMENTS

Figure 1:
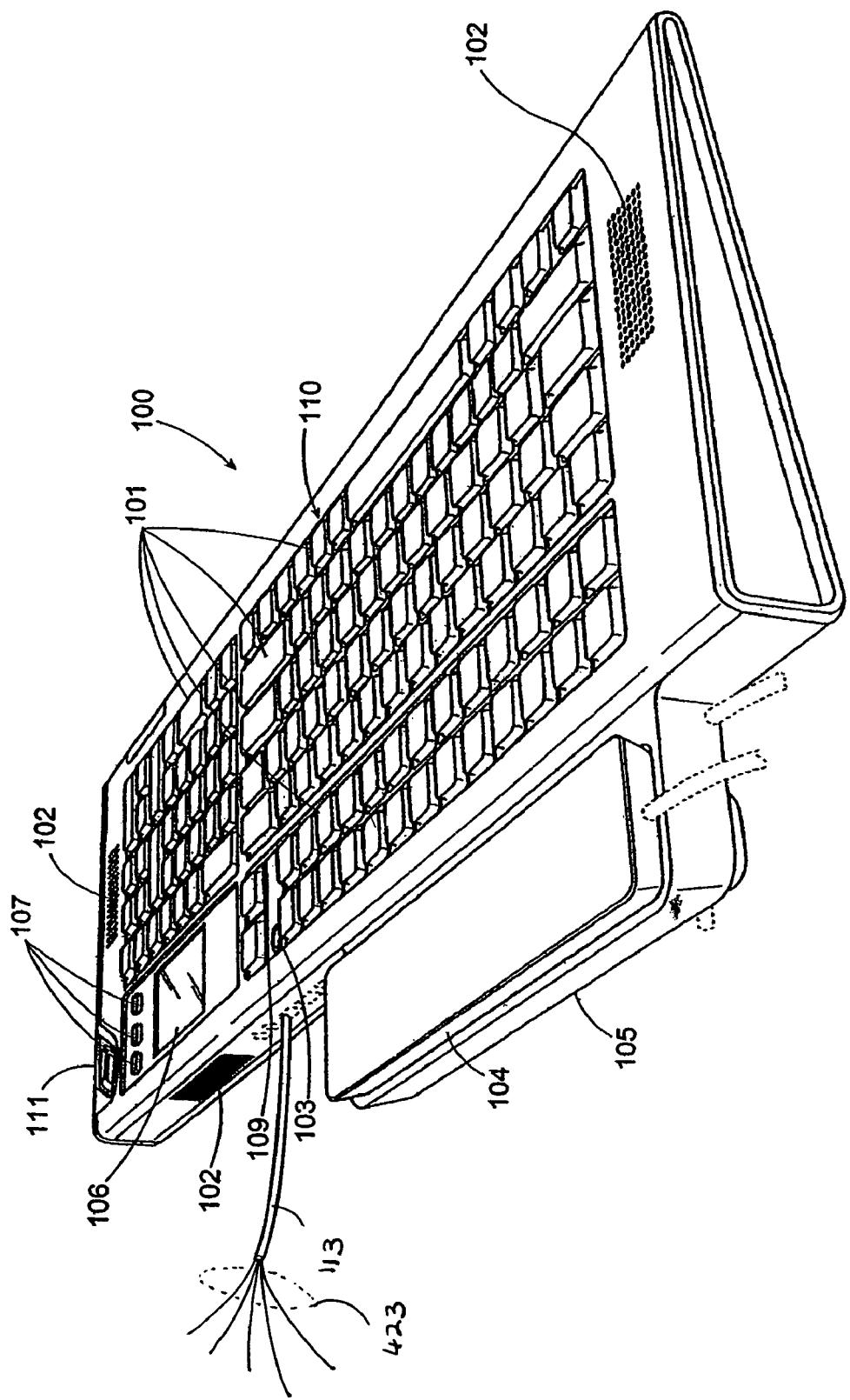
FIG. 1 is a schematic perspective view of an embodiment of a keyboard according to the invention.

FIG. 1 is a schematic perspective view of an embodiment of a keyboard according to the invention. Keyboard 100 comprises, inter alia, array 110 of keys 101, each key 101 associated with a switch for providing one or more signals relating to the state of the switch; protective grills 102 covering a plurality of speakers mounted to the keyboard; microphone 103 mounted to the keyboard and proximately located visual indicator device 109; telephone handset 104 and cradle 105 mounted to the keyboard; display 106 and a plurality switches 107 coupled to the display; biometric access control device 111; and cable 113 as means for passing telephony and audio signals and other input, output, and/or commands to a computer coupled to the keyboard.

Figure 2:
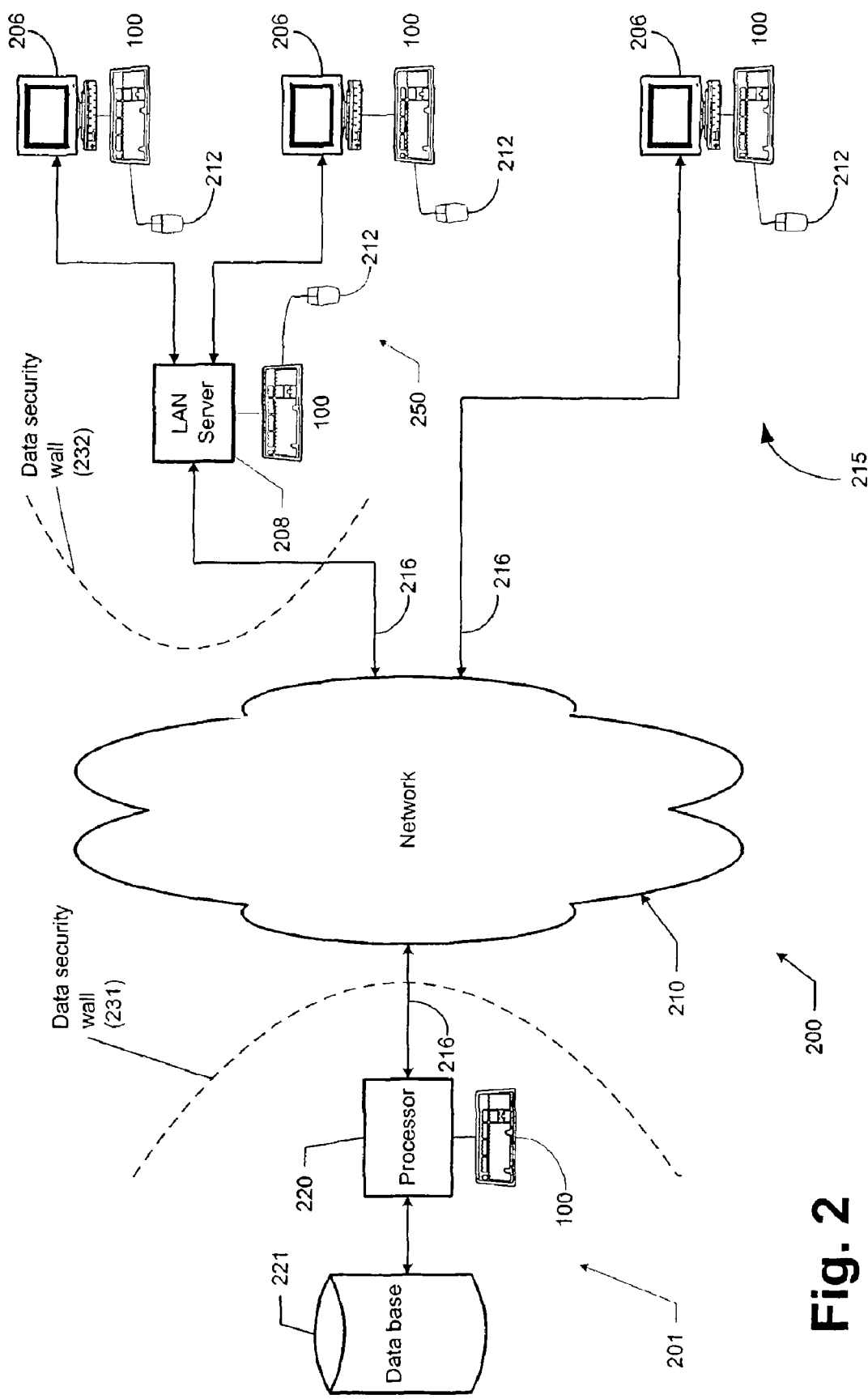
FIG. 2 is a schematic view of a computer system comprising a plurality of keyboards according to the invention.

Keyboard 100 is suitable for coupling to and for use in controlling and operating a wide variety of computers, including, for example, general-purpose computers and any other automatic data processing machines. For example, FIG. 2 shows a plurality of keyboards 100 coupled to a variety of computers, including stand-alone personal computer system 215, workstations 206 of local area network 250, local area network (LAN) server 208, and server or host system 201 and processor 220, all linked by communications links comprising, for example, network 210, which may include the Internet or any type or combination of public, private, and/or secure communications networks.

One use of keyboards 100 is to provide input to computers coupled to the keyboards. One way in which this may be accomplished is through the operation of keys 101 and their associated switches. Pressing keys 101 in various sequences and combinations may be used to send commands, data, and other information to computer(s) coupled to the keyboard, for processing either by the computer(s) coupled directly to the keyboard or by other computers linked to the keyboard through such computer(s). For example, a user of keyboard 100 coupled to computer 206 at system 215 in FIG. 2 may use the keyboard to provide input to and process data or commands received from computer 206 of system 215, or via communications links 216, 210, to/from any of the other computers 201, 250.

Preferred keyboards according to the invention provide arrays of alphanumeric keys, with or without additional numeric, mathematical calculation, and symbol and functional keys, special purpose keys or key groups provided for use in controlling computers in special functions, and any other keys and/or switches consistent with the disclosure herein. Keys may be used to activate their corresponding switches by pressing. The invention may be implemented with a wide variety of key arrangements, including QWERTY, the Dvorak scheme, and others. For example, keyboard 100 of FIGS. 1 and 3 comprises a full QWERTY alphanumeric array 301, with punctuation, formatting, and control keys; special function key group 302, the keys being assignable to perform specified functions by users, administrators, etc., of the keyboard or computers and/or systems coupled thereto; numeric/mathematical calculation keypad 303; and communications and keyboard control keypads 304, 305. Keypad 304 may comprise keys used to control e-mail and other computer communications, while keypad 305 may comprise keys used to control speaker volume, squawk functions, and other audio and/or telephony functions. For example, activation of "MESSAGE" key 356 at a time when indicator light 357 is illuminated retrieves new e-mail messages addressed to the user logged in at keyboard 100, indicator light 357 being illuminated on command of processor 401 or other processor upon receipt of a new e-mail. The volume of speakers mounted on or coupled to keyboard 100 may be increased by activating key 358, and decreased by activating key 359.

Figure 3:
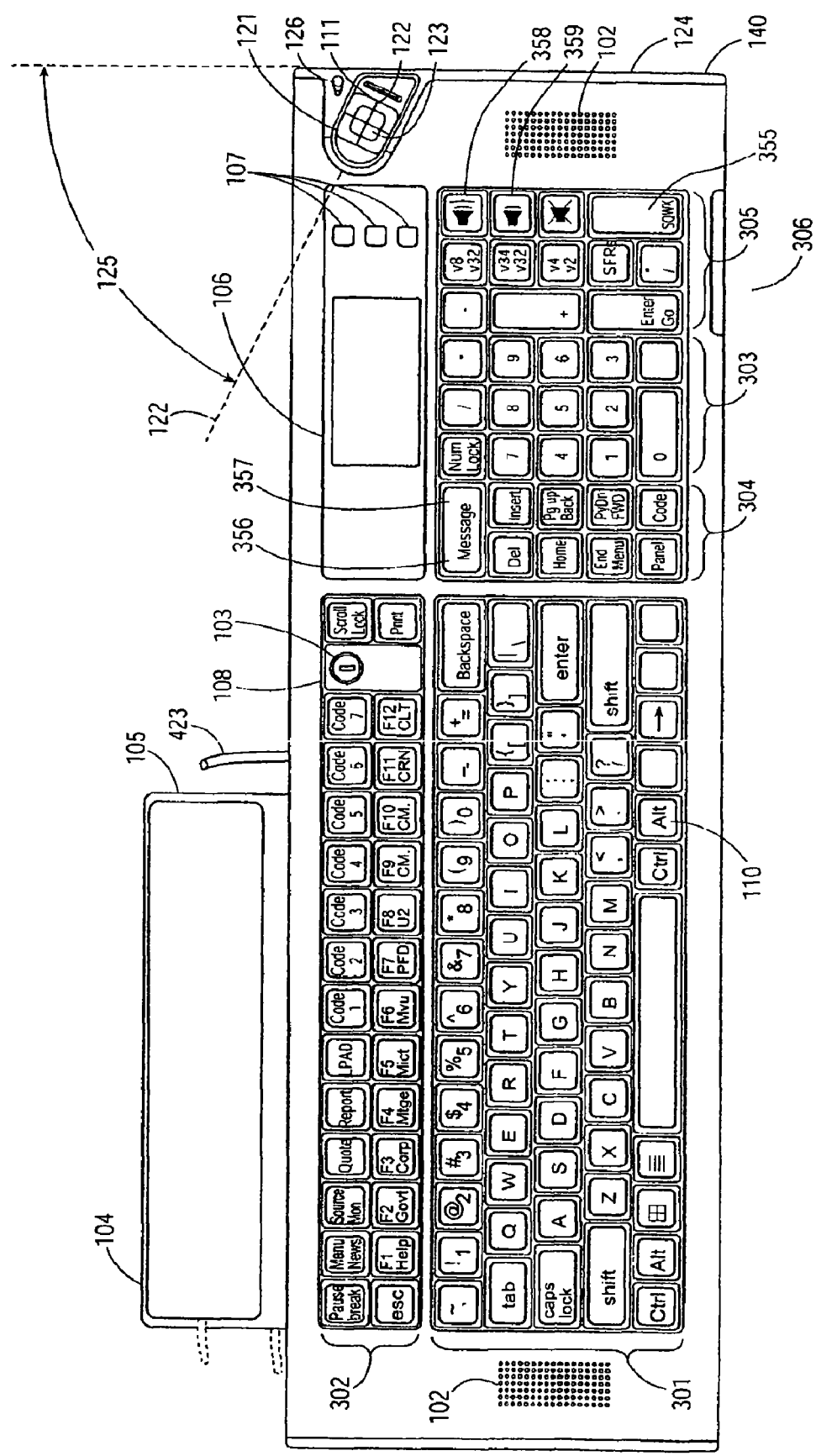
FIG. 3 is a schematic plan view of an embodiment of a keyboard according to the invention.

Keyboard 100 of FIG. 3 further comprises, inter alia, infrared sensor 306, for use in wireless communications between the keyboard and pointing or other 15 devices supported by the keyboard.

Figure 4:
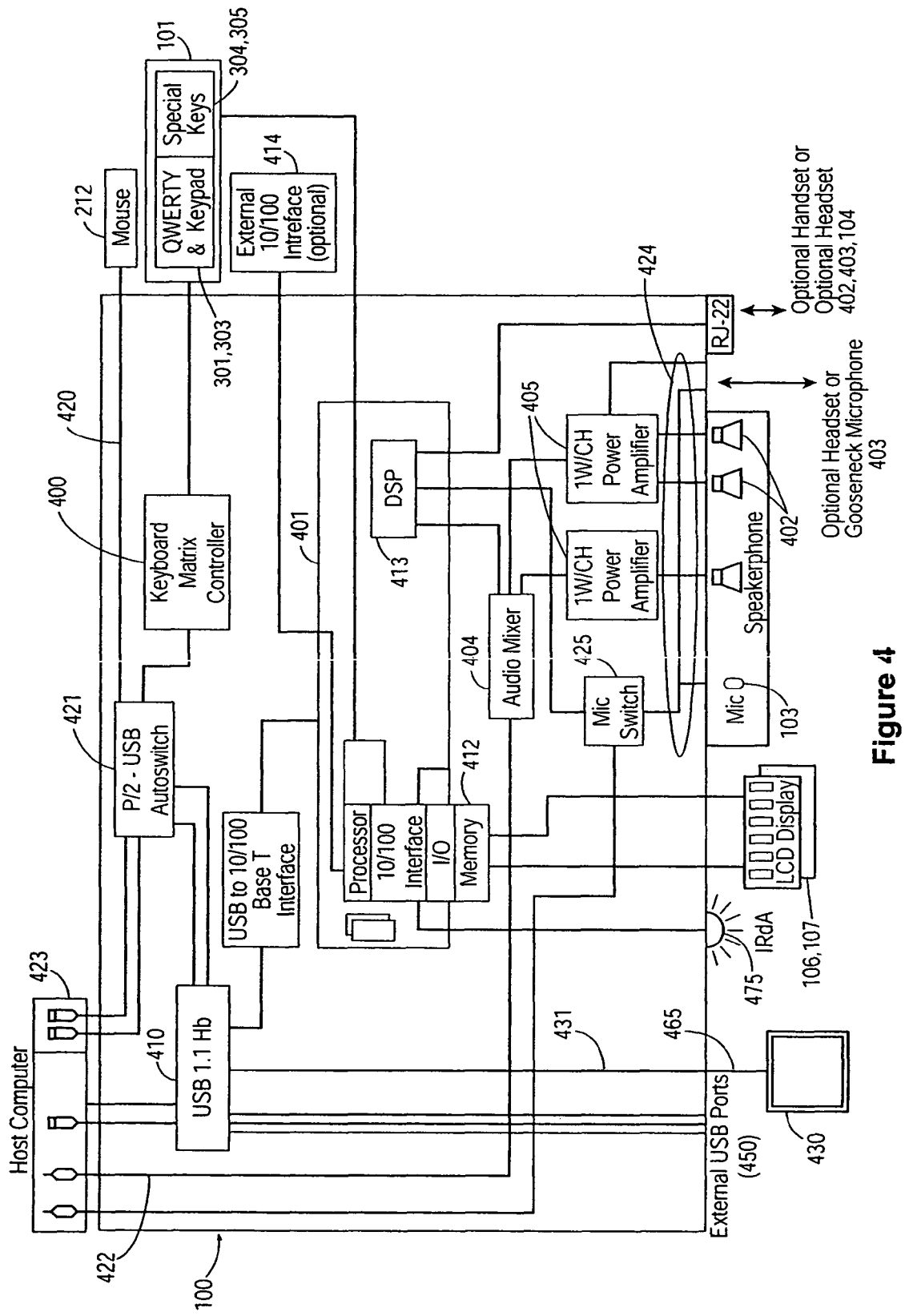
FIG. 4 is a schematic diagram of a keyboard according to the invention

FIG. 4 is a schematic functional diagram of a keyboard according to the invention. Keyboard 100 comprises controller 400, processing unit 401 (which may comprise one or more processors); USB hub 410; audio mixer 404; a plurality of amplifiers 405; biometric access control device 430; and connections 423 for coupling the keyboard to a computer to facilitate data and control input between the computer and the keyboard.

Controller 400 is coupled to switches for keys 101 (FIGS. 1, 3) in groups 301, 303, 304, 305, to provide signals relating to the state of the switches to processors 401, 402, to any computer(s) coupled to the keyboard, and to any other desired devices. As will be understood by those skilled in the art of designing and/or implementing such systems, any combination or arrays of keys, switches, and controllers suitable for the purposes described and/or intended for the systems used will serve. A large number of key-switch-controller combinations suitable for incorporation in keyboards for controlling computers according to the invention are available commercially, from sources such as, for example, Advanced Input Devices of Coeur D'Alene, Id. (www.advanced-input.com). As will be appreciated by those skilled in the art, such combinations may also be made specially for the purpose, incorporating technologies such as application-specific integrated circuits (ASICs). The identification, design, and/or integration of suitable key-switch-matrix combinations will not trouble those of ordinary skill in the art once they have been made familiar with this disclosure.

Processing unit 401 comprises one or more processors or combinations of processors 412, 413 to provide functions for controlling and providing input and/or output to devices coupled to the processor(s) and/or keyboard, including for example telephones, biometric access devices, speakers, microphones; and other telephony and/or audio processes; and peripherals such as pointer and other 1/0 devices; and are programmed, designed, or otherwise adapted to receive input from and provide output for the keypad(s) and from other devices coupled thereto, such as for example touchpads, pointers, and other 1/0 devices. In the embodiment shown in FIG. 4, a plurality of general- and special-purpose processors 412, 413 provide functions related to general process controls and telephony, including providing audio signals to the audio circuit from telephony signals provided by the computer, and providing telephony signals for output to the computer from audio signals provided by a microphone, and providing audio signals from telephony signals provided by the computer. Preferably, one or more processors 412, 413 provide full support for audio and computer telephony functions, including all input, output, and control functions required for facilitating sound recording, transmission, and reproduction, and communications, including all signal processing, according to computer network protocols, particularly packet-switched communications according to, for example, Internet Protocol (IP) telephony such as Voice Over Internet Protocol (VOIP)

Individual processors incorporated within keyboards according to the invention may provide a wide variety of generalized and/or special functions, and may comprise one or more integrated circuits, including ASICs. A suitable processor 412 for use in supporting telephony functions in keyboards according to the invention comprises a combination of a T8301 Internet Protocol (IP) telephone digital signal processor (DSP) available from Lucent Technologies of Allentown, Pa. (www.lucent.com) and a T8302 Internet Protocol (IP) telephone Advanced Reduced Instruction Set Computer Machine (ARM) available from Agere Systems (www.agere.com), to form an internet protocol telephone.

Figures 1, 5A:
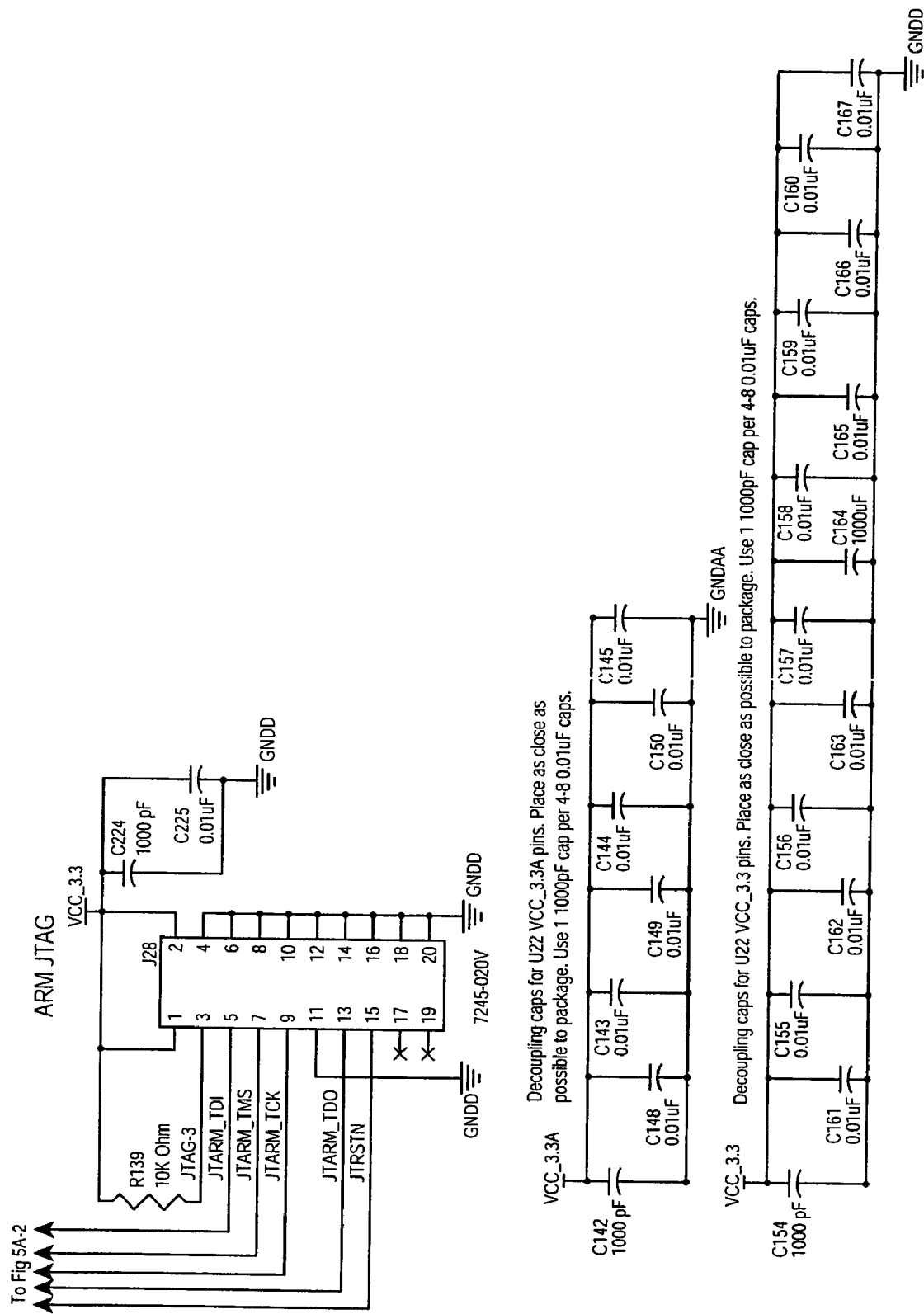
FIGS. 5*a* and 5*b* provide a schematic diagram of an embodiment of a processor suitable for implementation in keyboards according to the invention.
Figures 2, 5A:
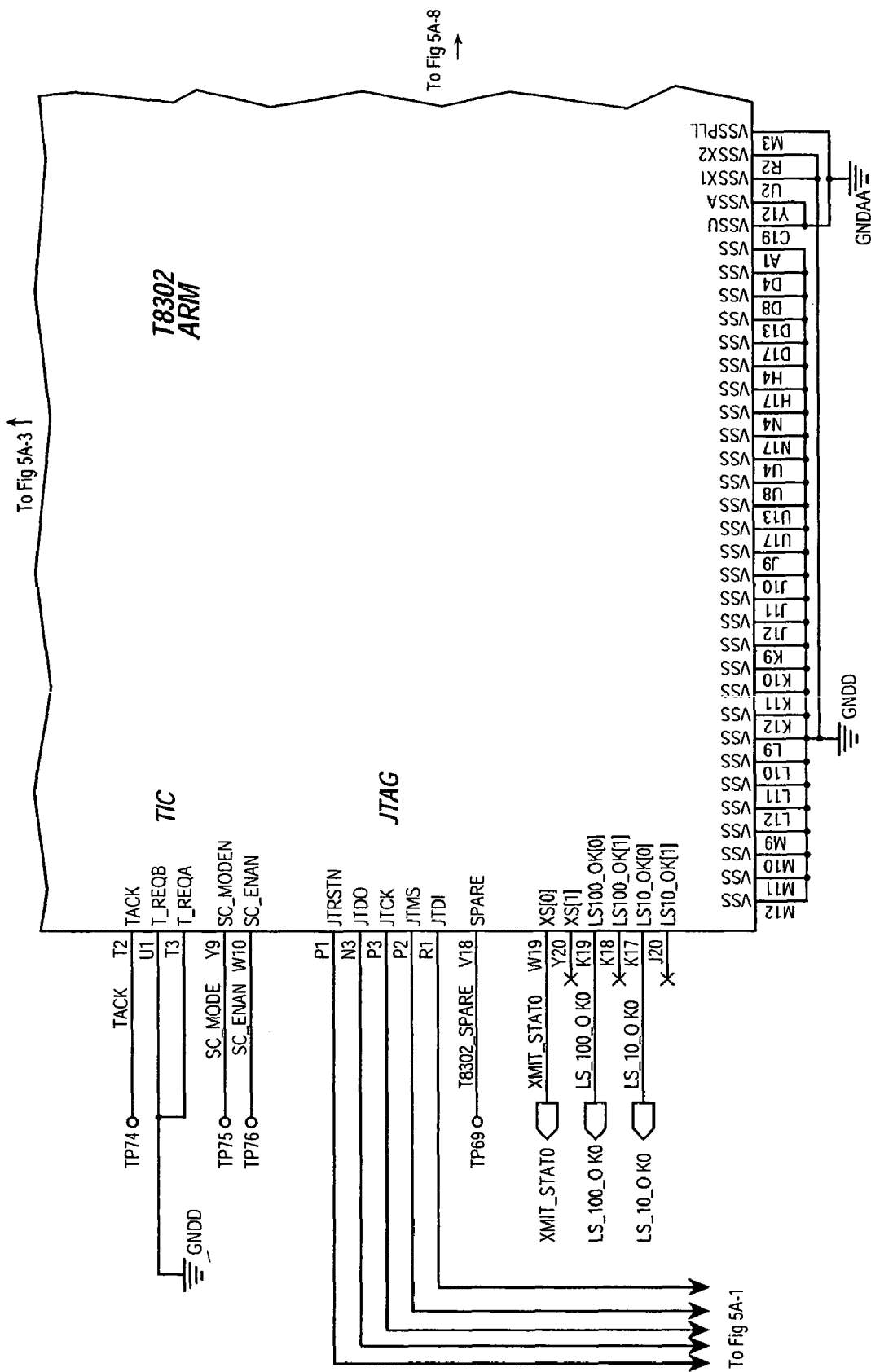
Figures 3, 5A:
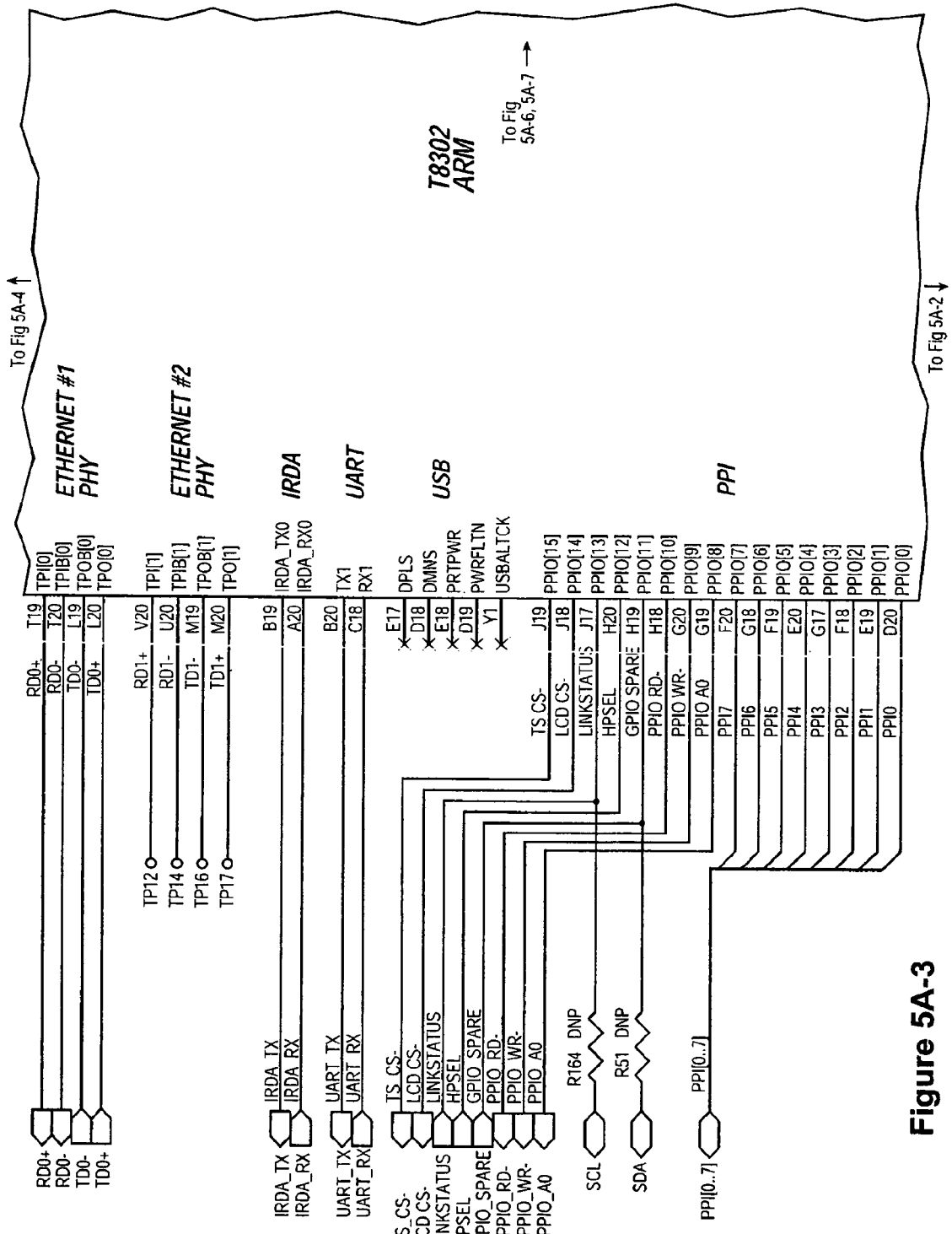
Figures 4, 5A:
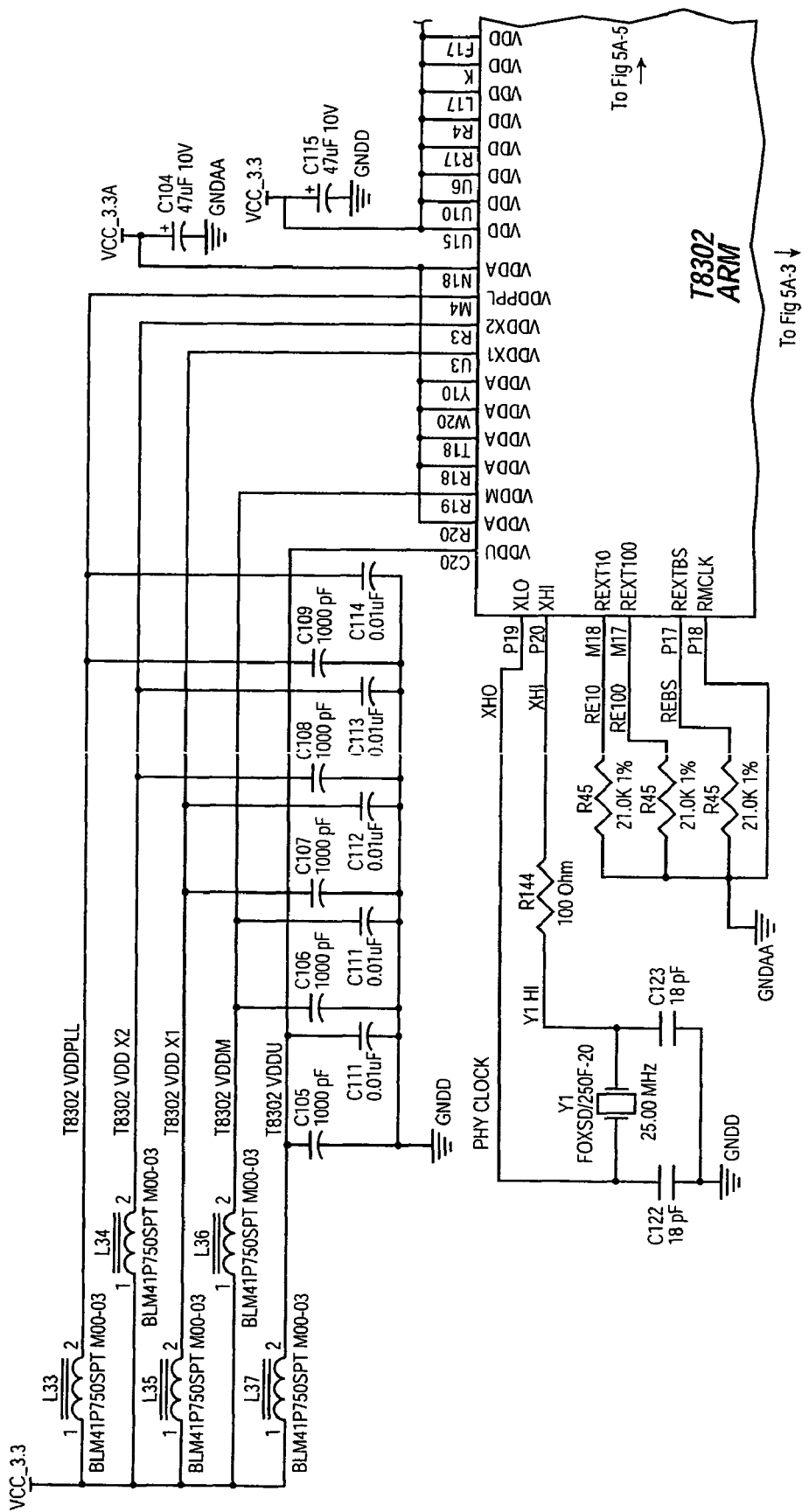
Figures 5, 5A:
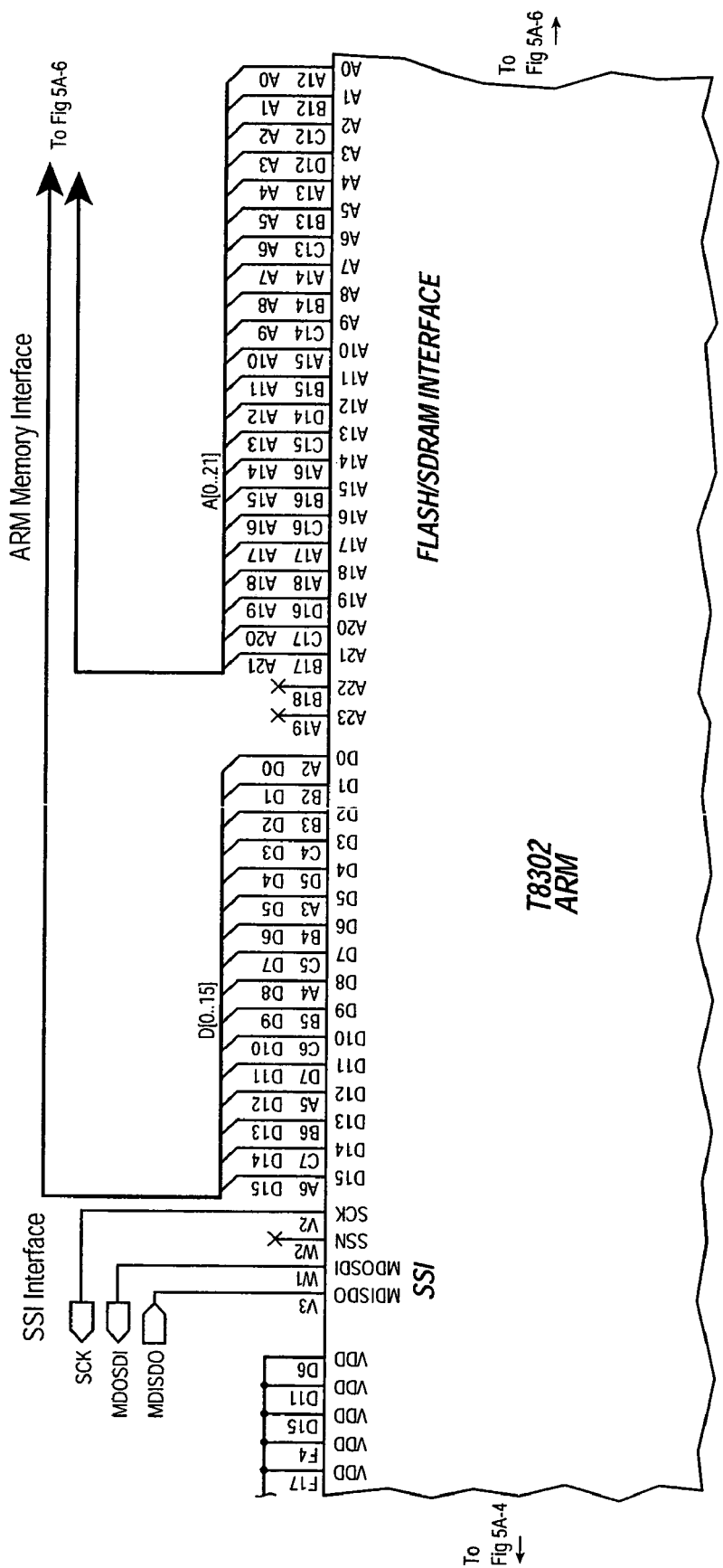
Figures 5, 5A, 6:
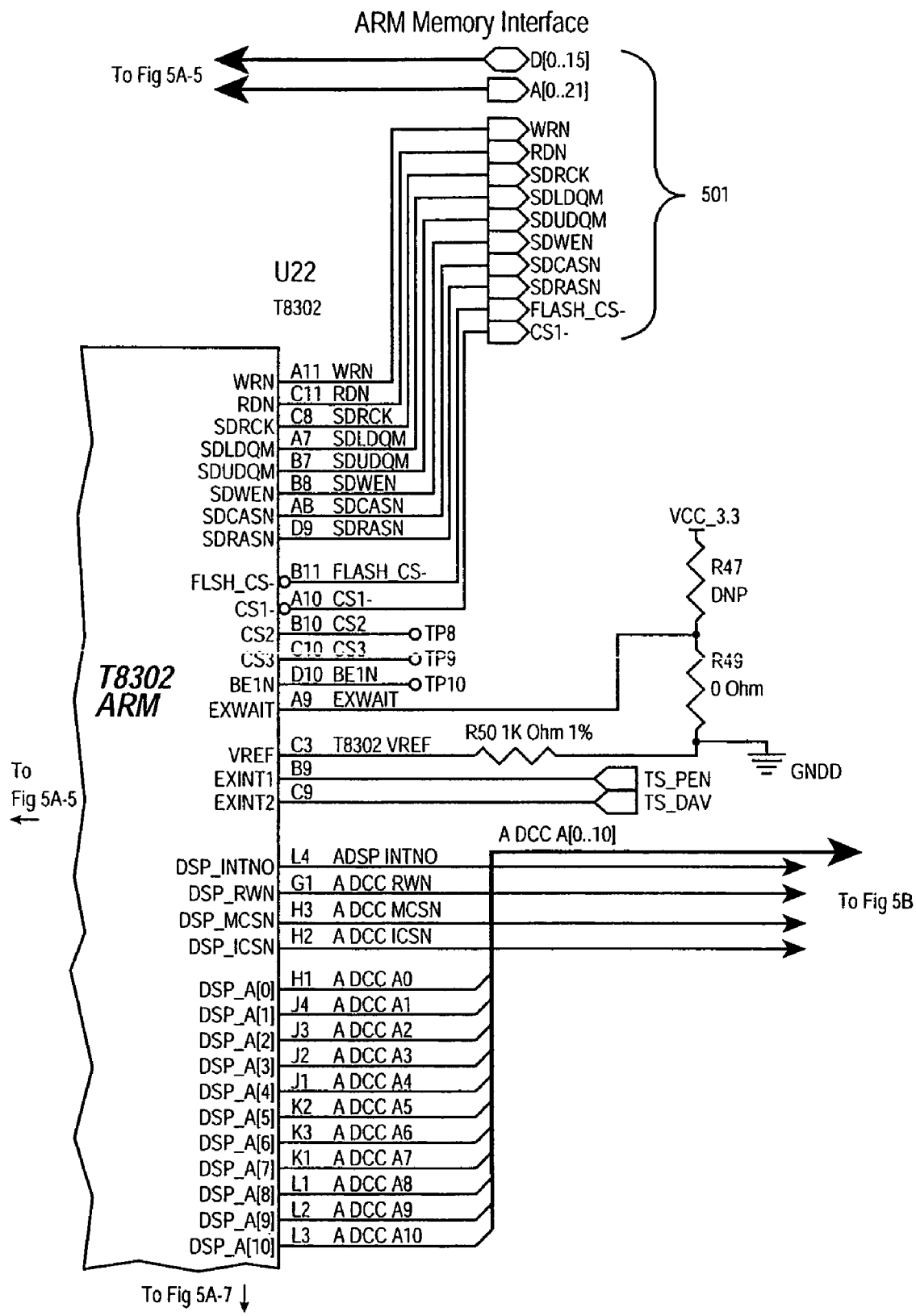
FIG. 6 is a schematic diagram of a memory suitable for implementation 15 in keyboards according to the invention.
Figures 5, 5A, 6, 7:
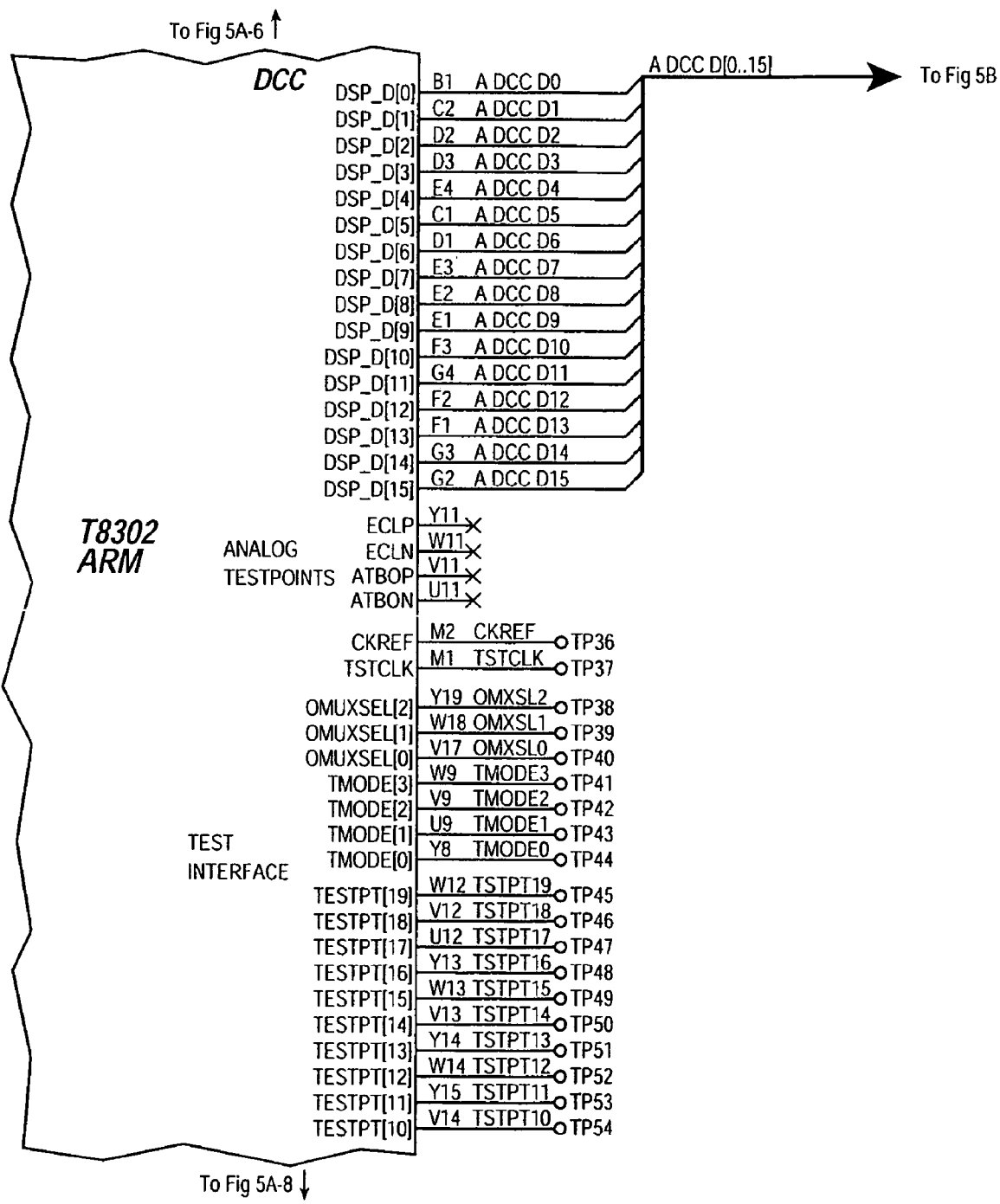
FIG. 7 is a schematic diagram of an embodiment of a uniform serial bus interface suitable for implementation in keyboards according to the invention.
Figures 5, 5A, 6, 7, 8:
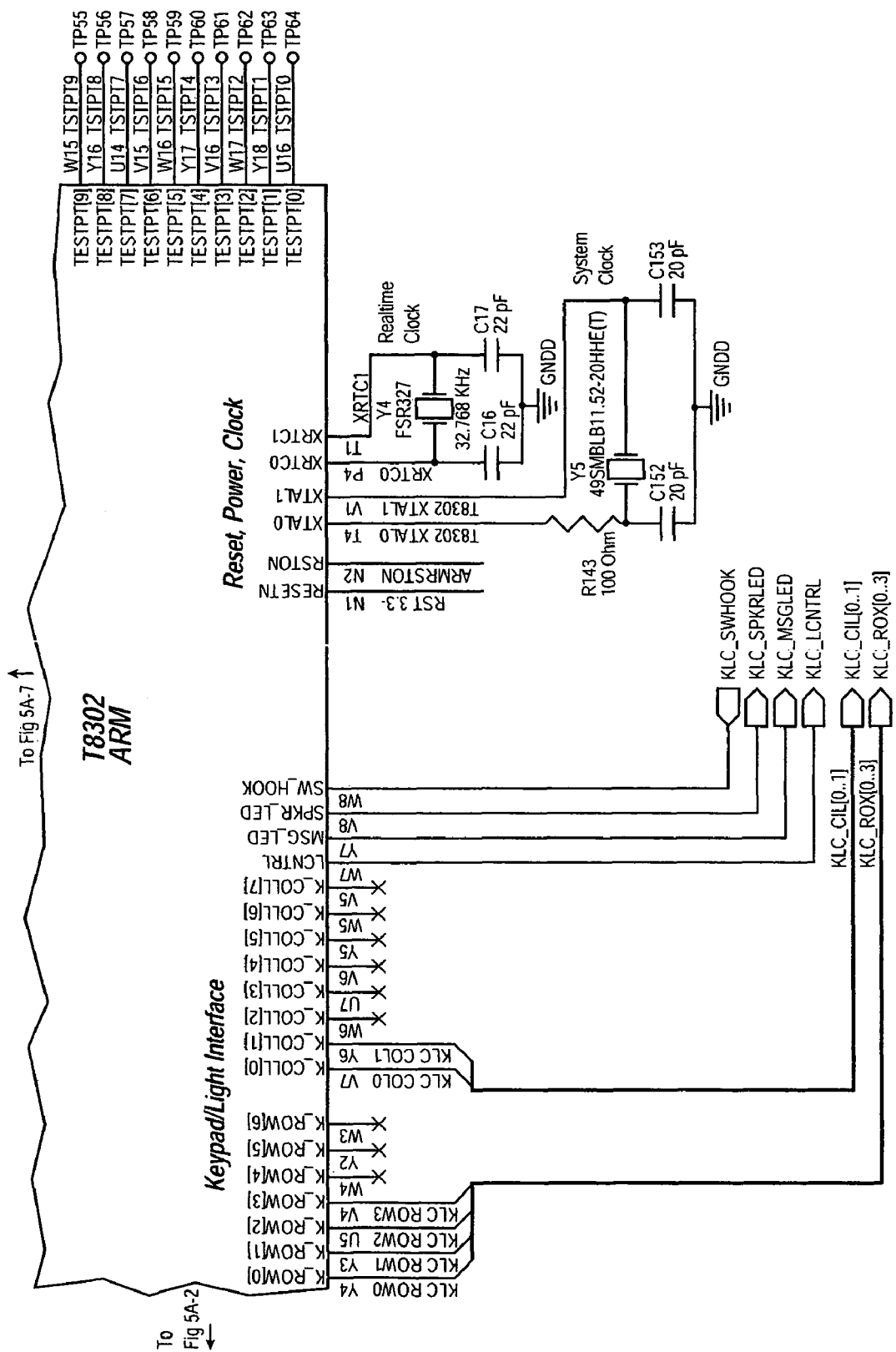
FIG. 8 is a schematic diagram of an embodiment of a display interface suitable for implementation in keyboards according to the invention.
Figures 1, 5B:
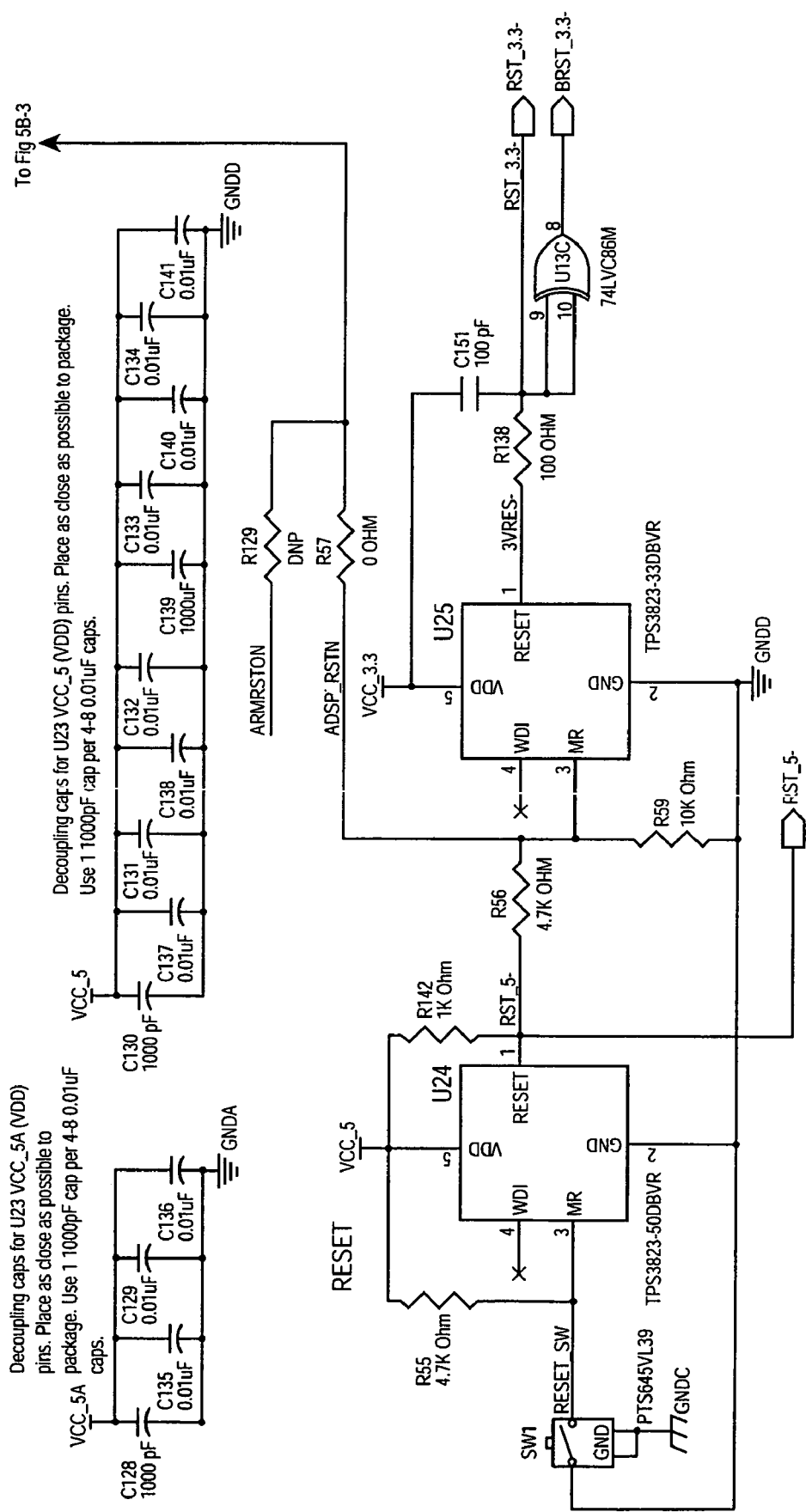
Figures 2, 5B:
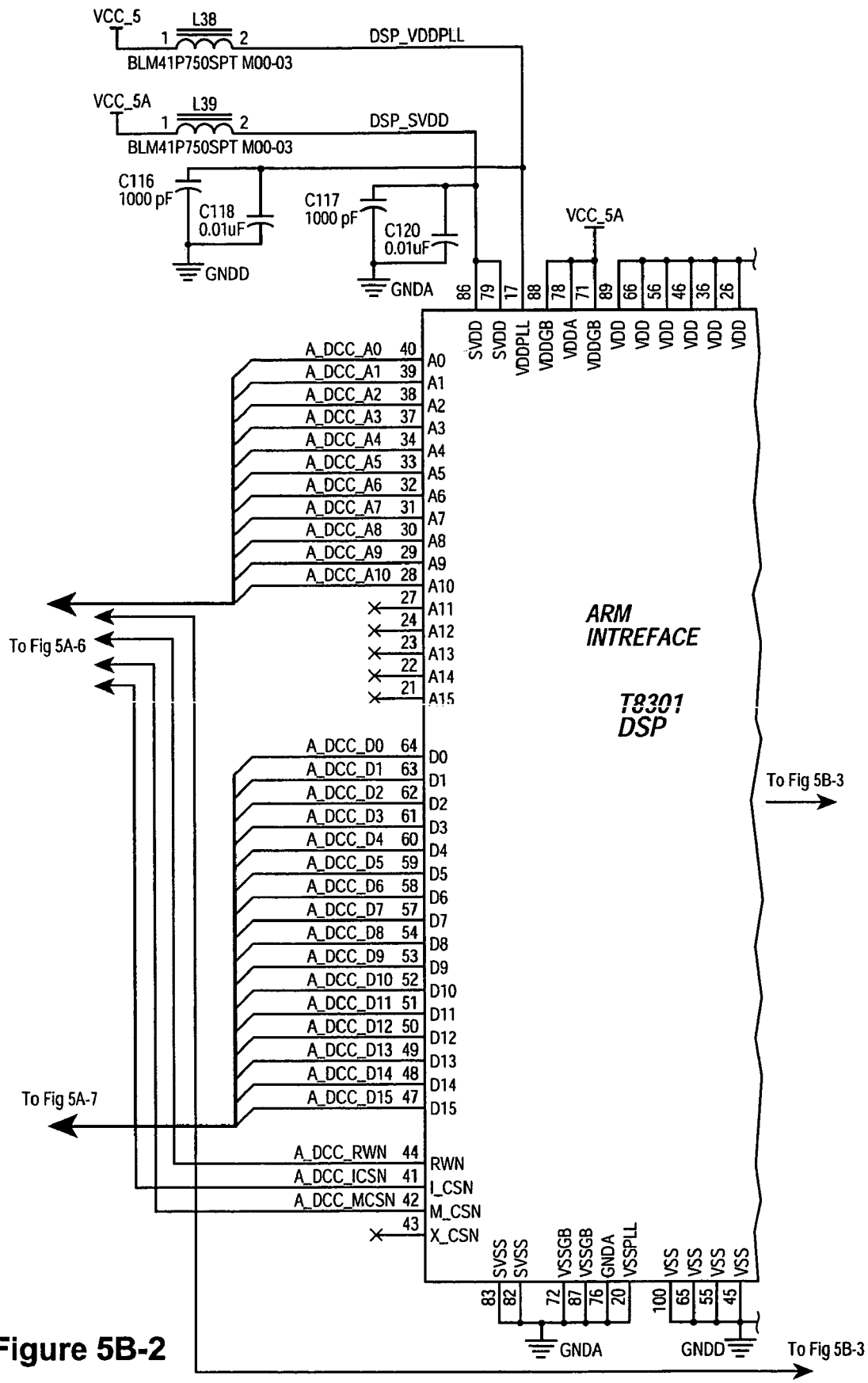
Figures 1, 6:
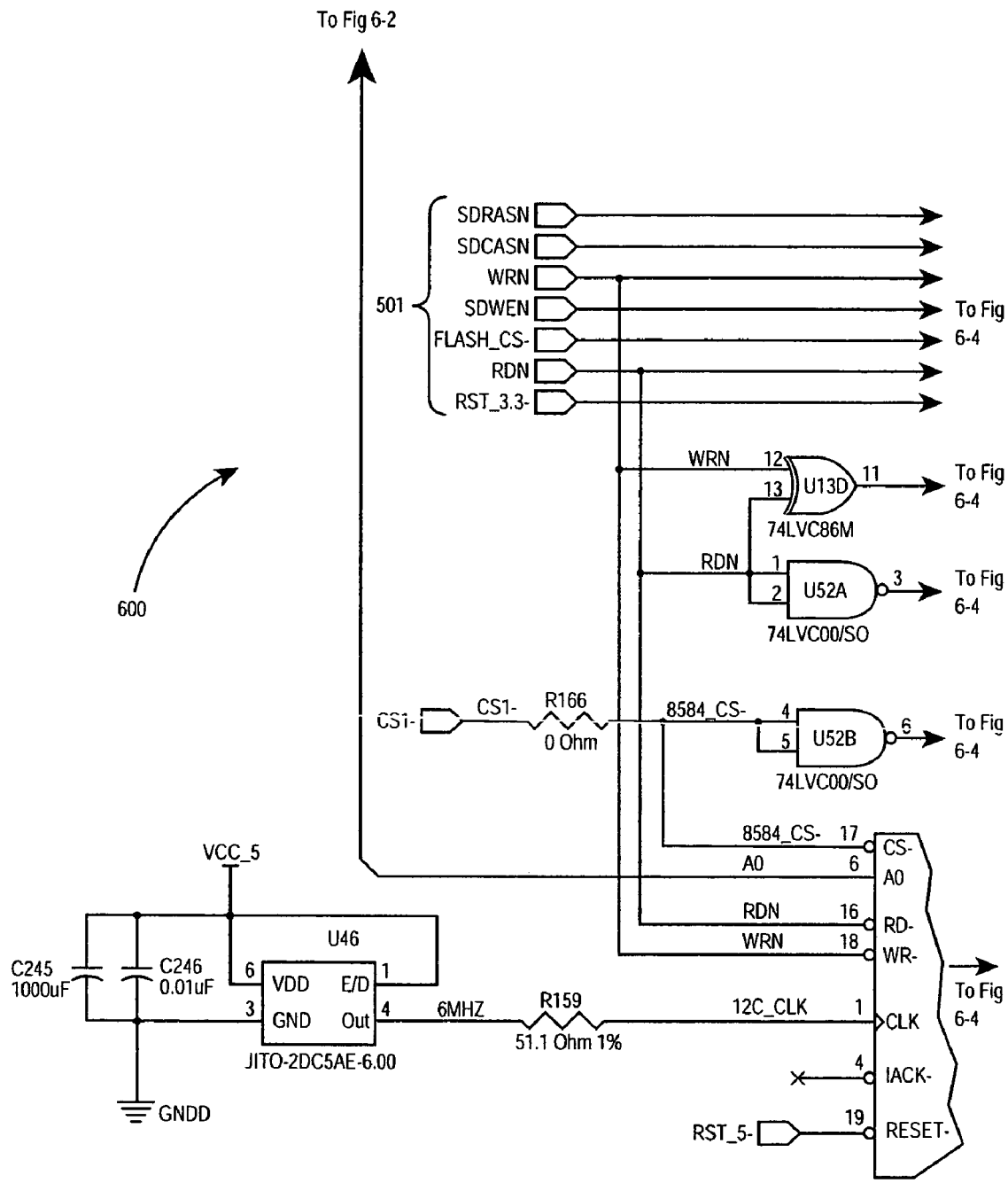
Figures 2, 6:
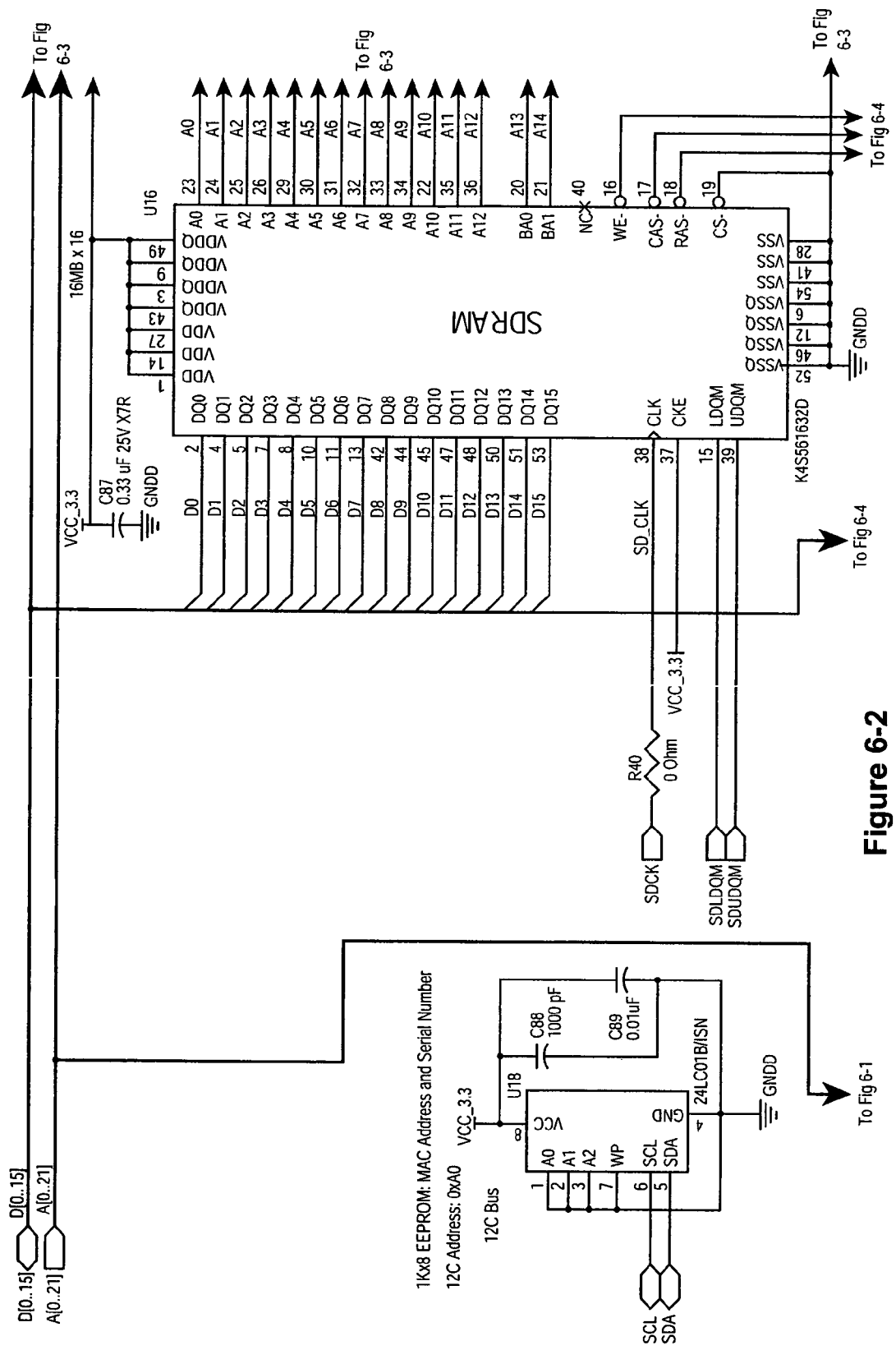
Figures 3, 6:
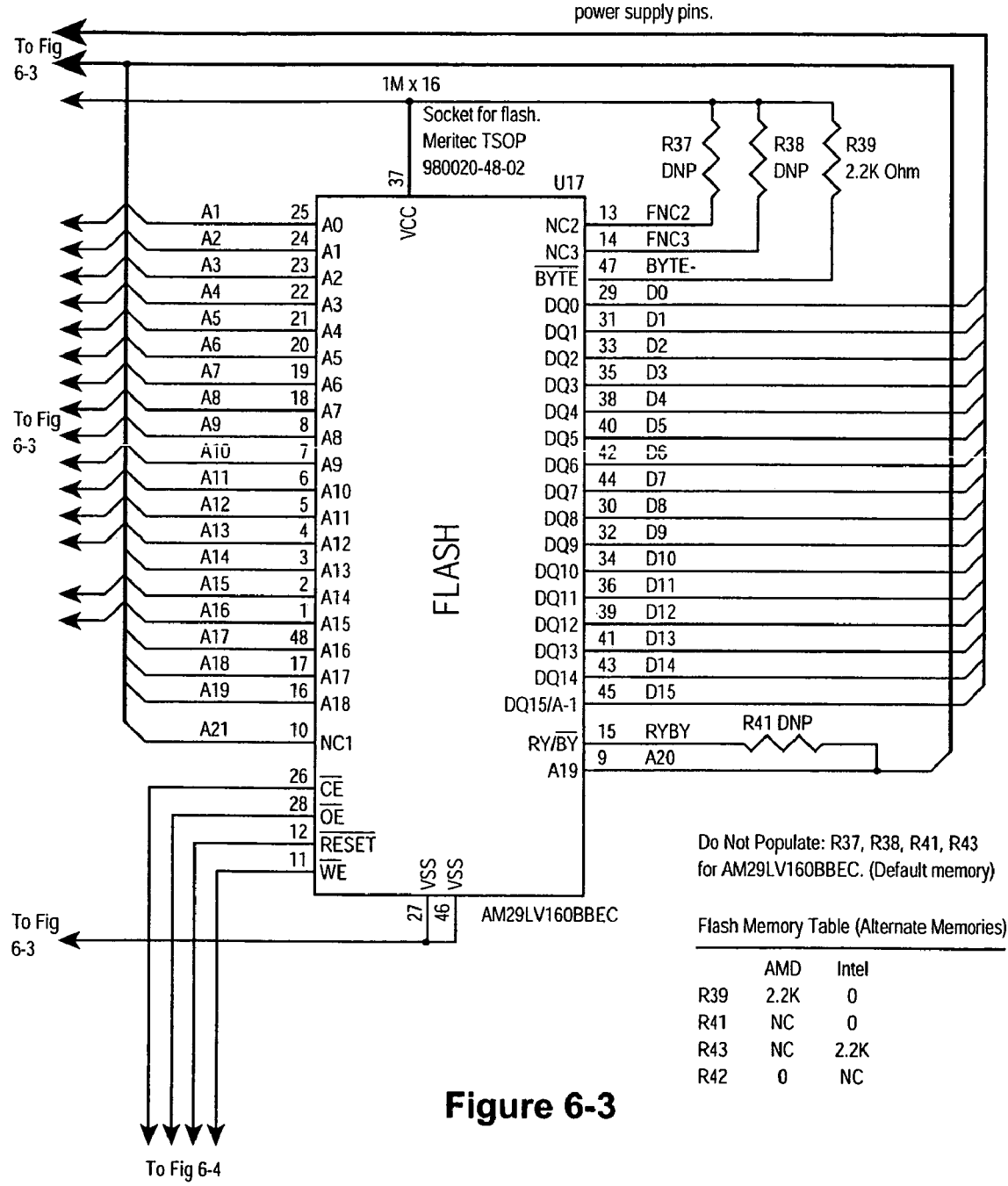
Figures 4, 6:
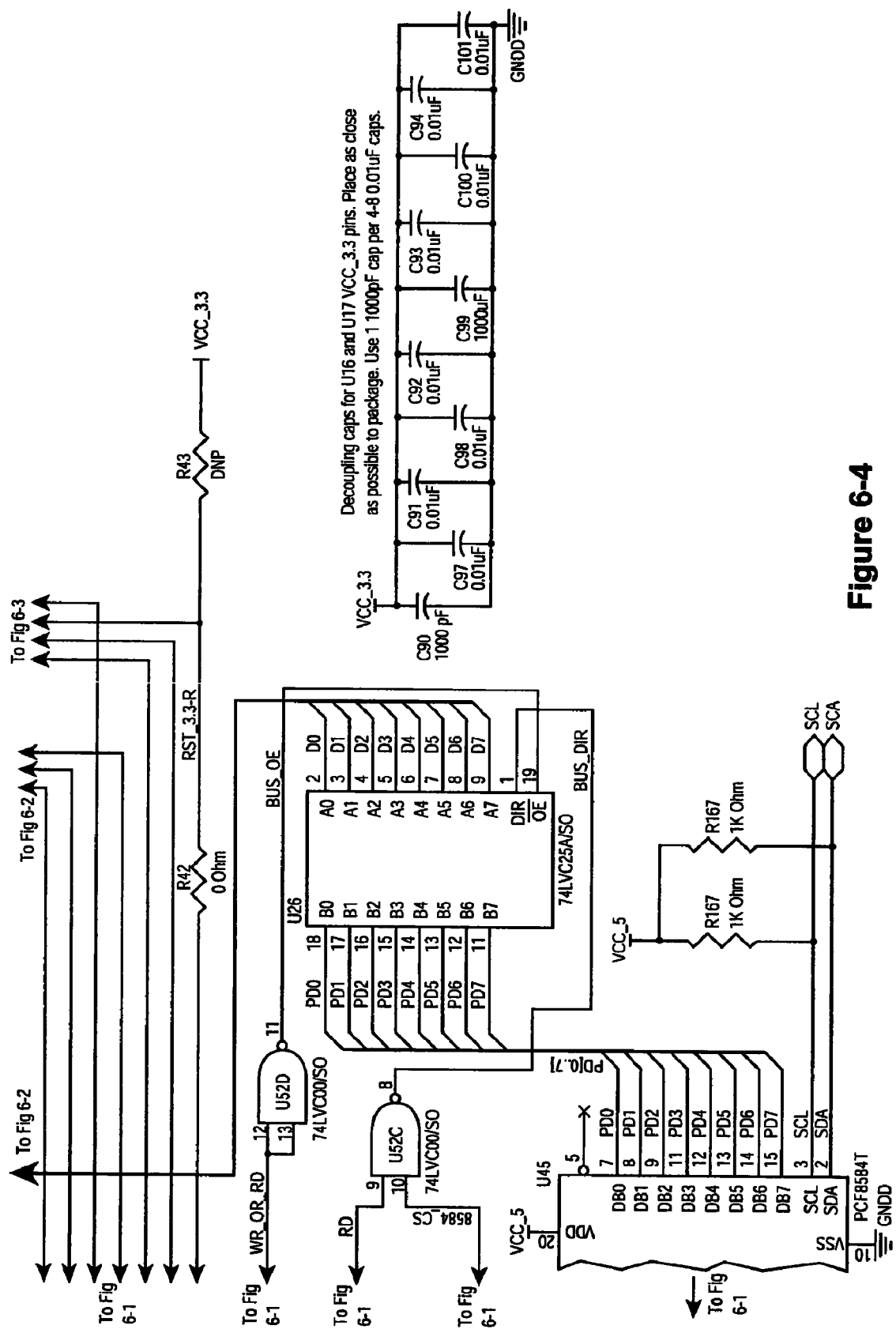
Figures 1, 7:
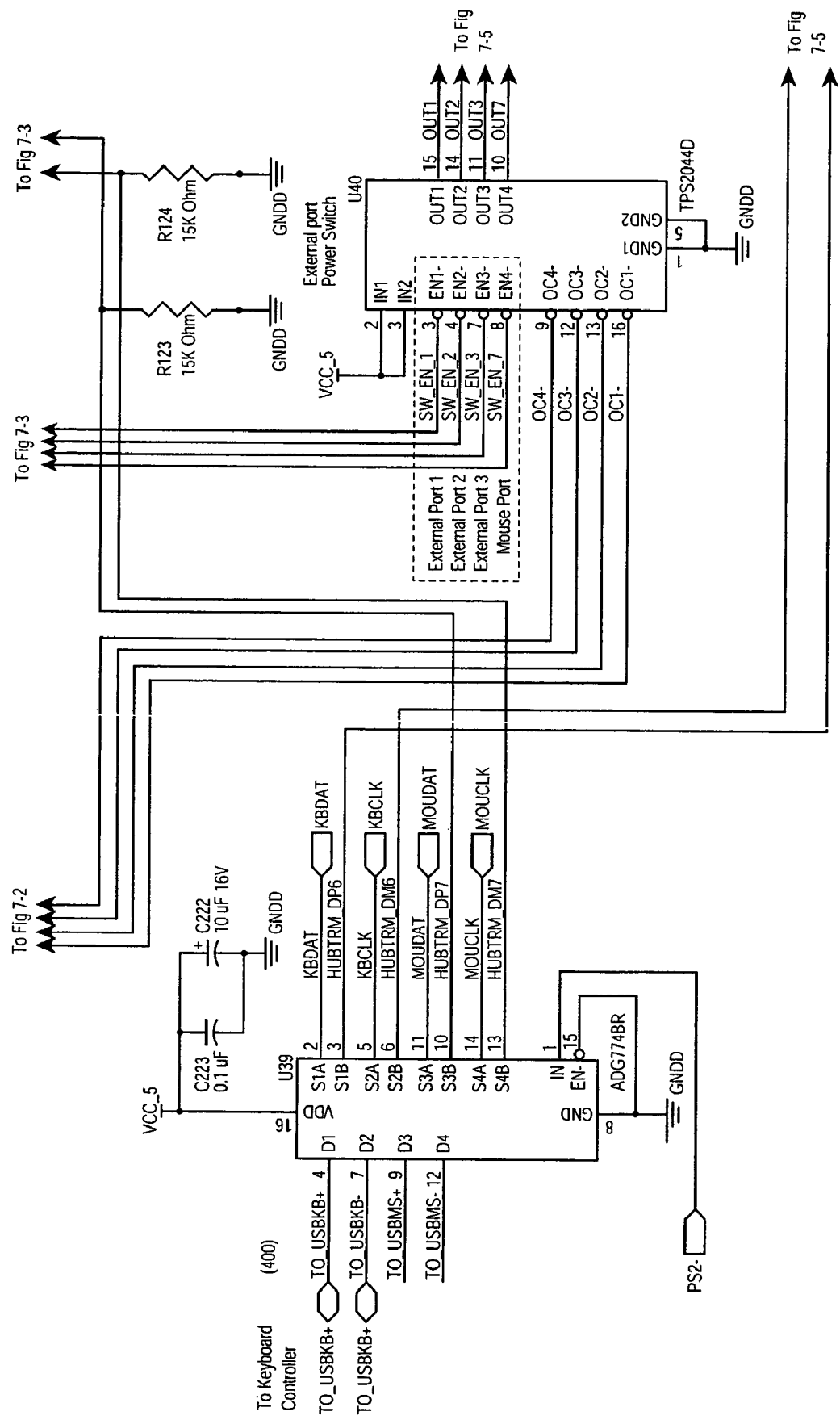
Figures 2, 7:
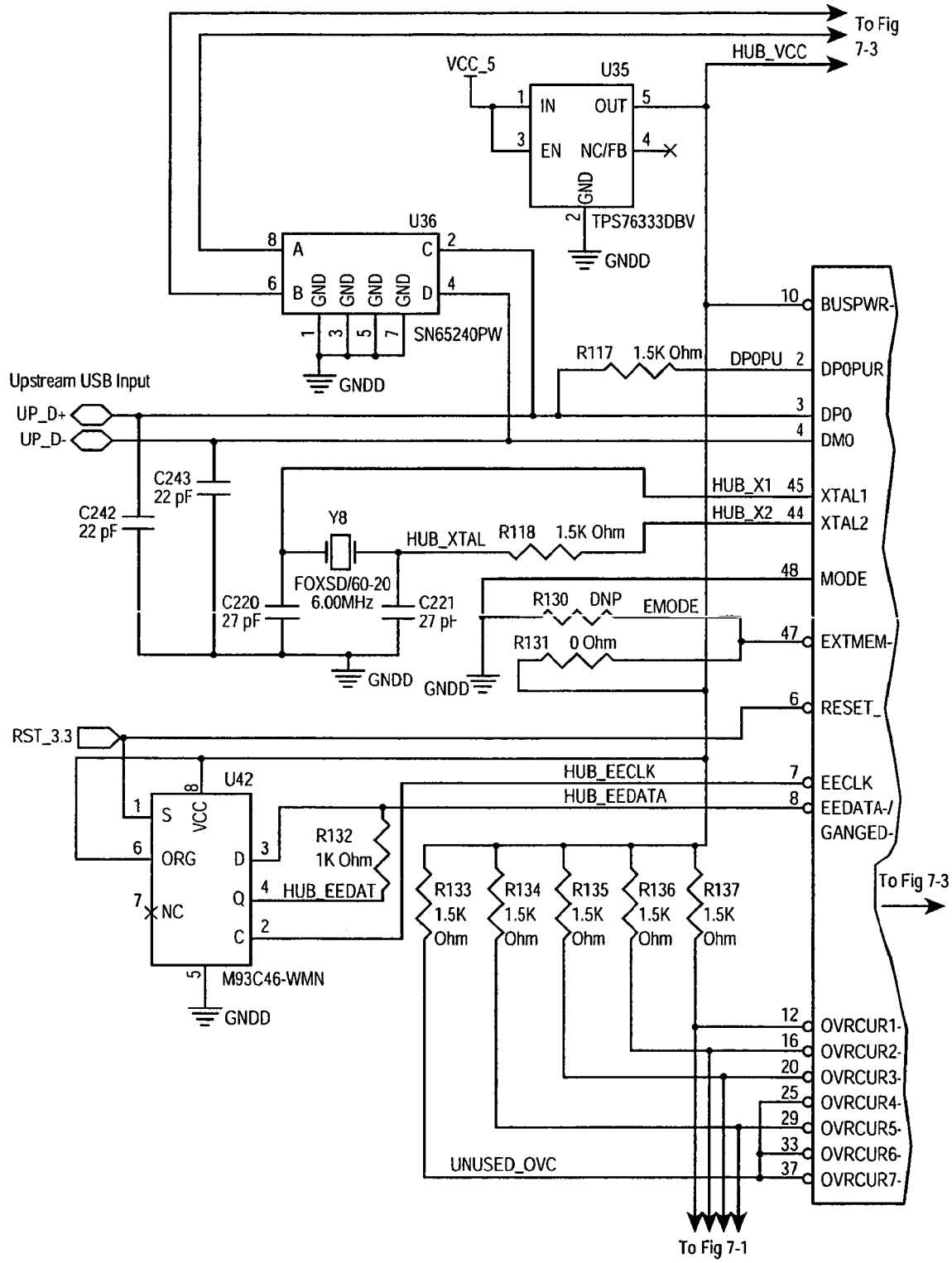
Figures 3, 7:
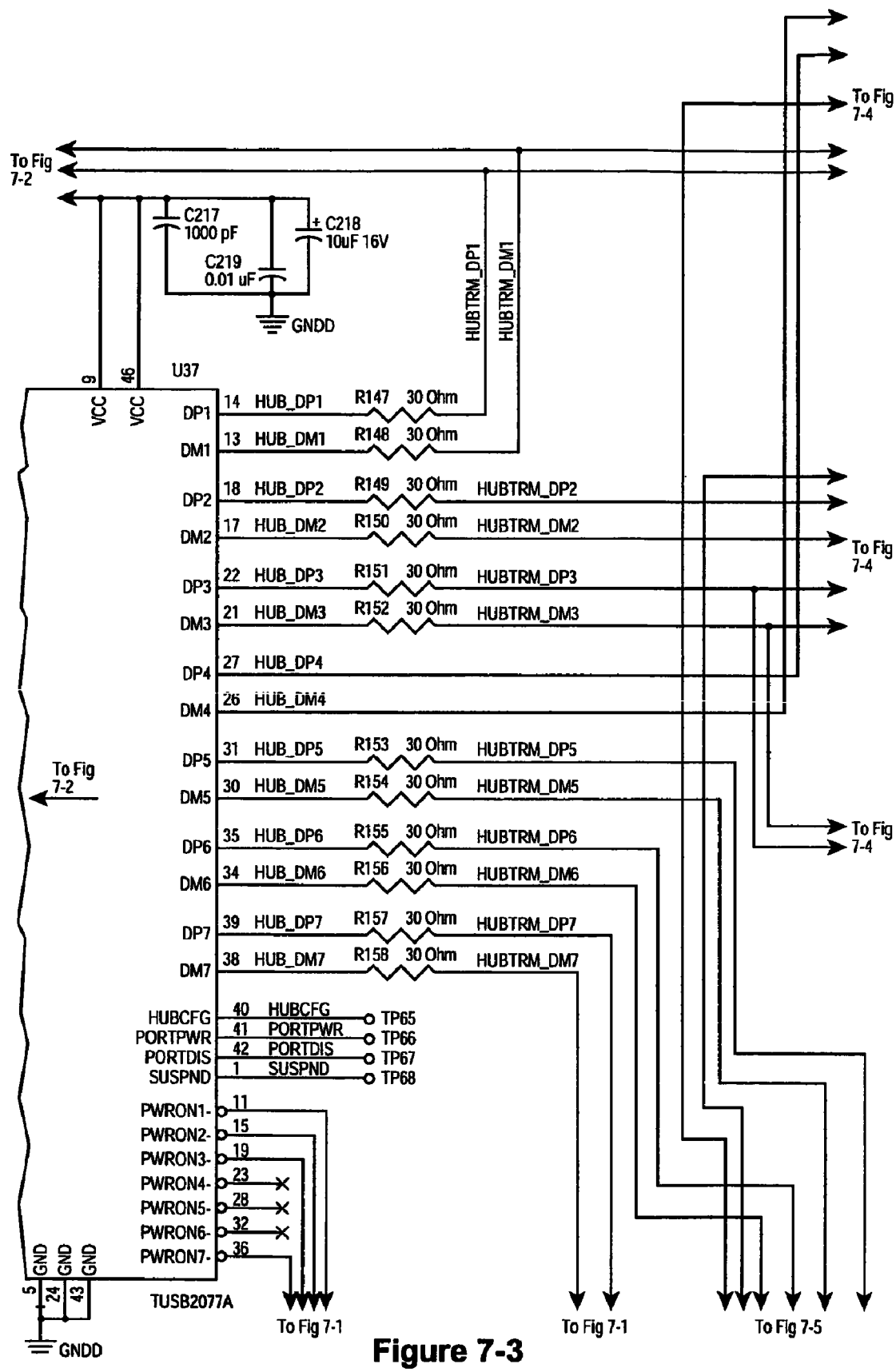
Figures 4, 7:
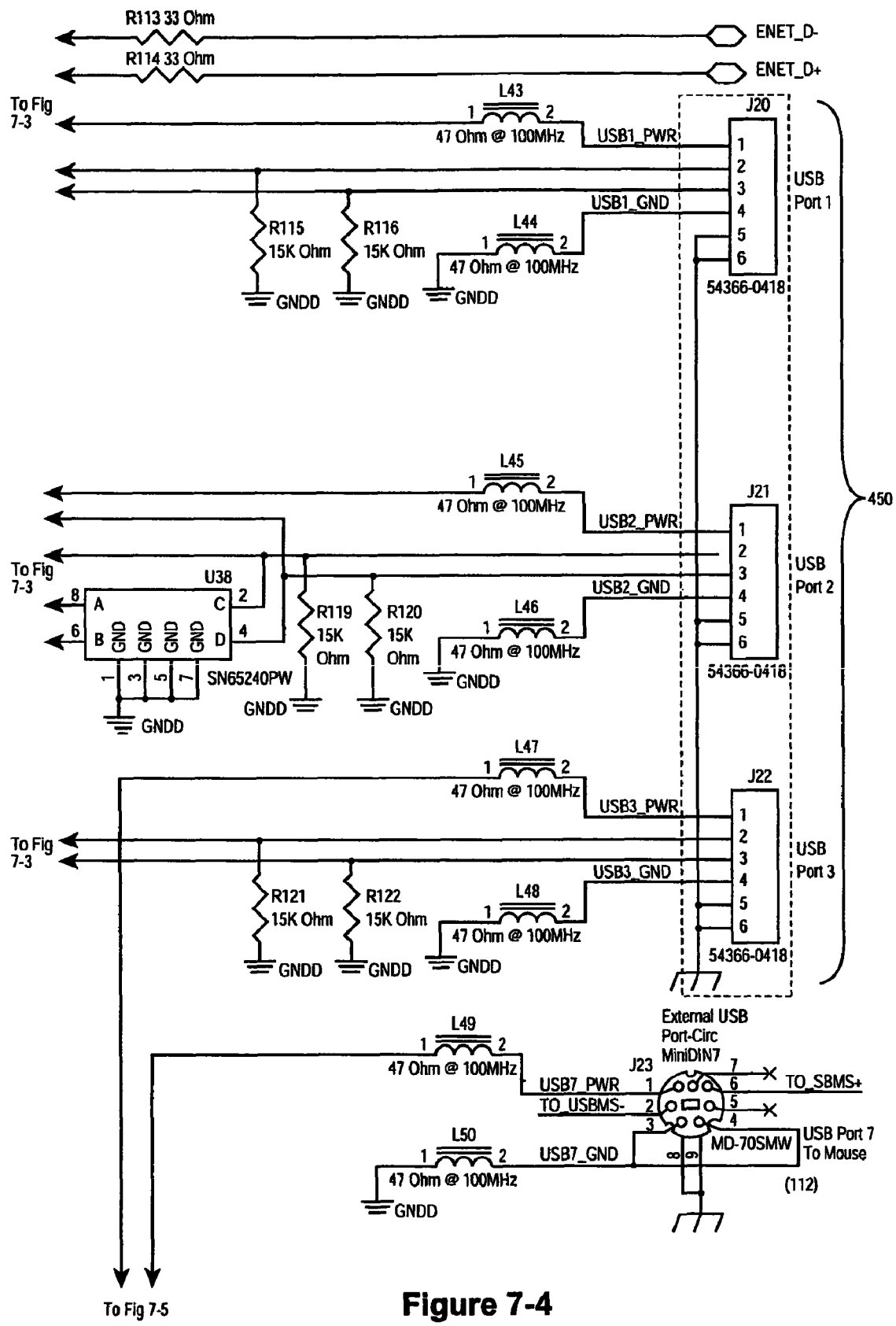
Figures 5, 7:
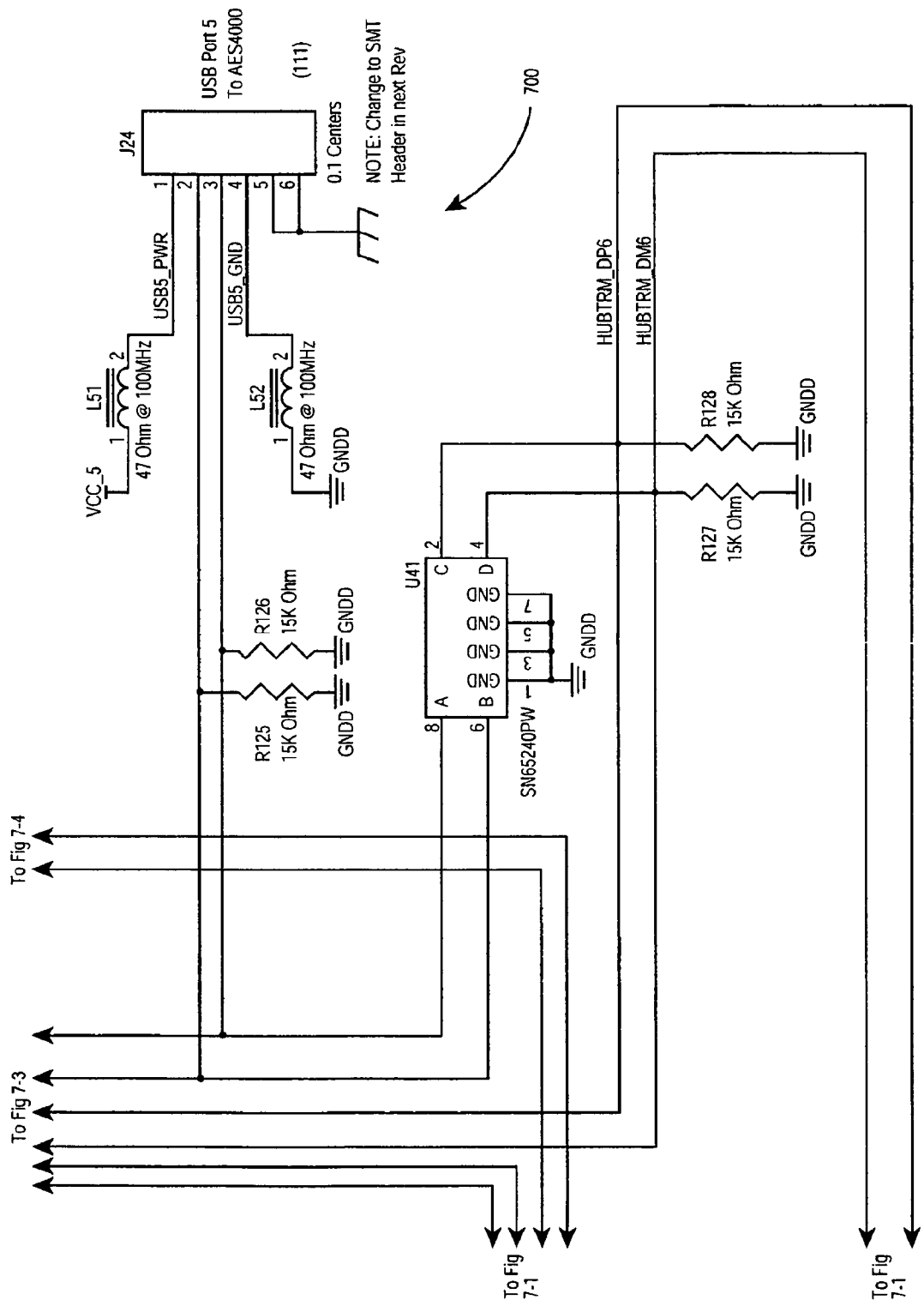
Figures 6, 7:
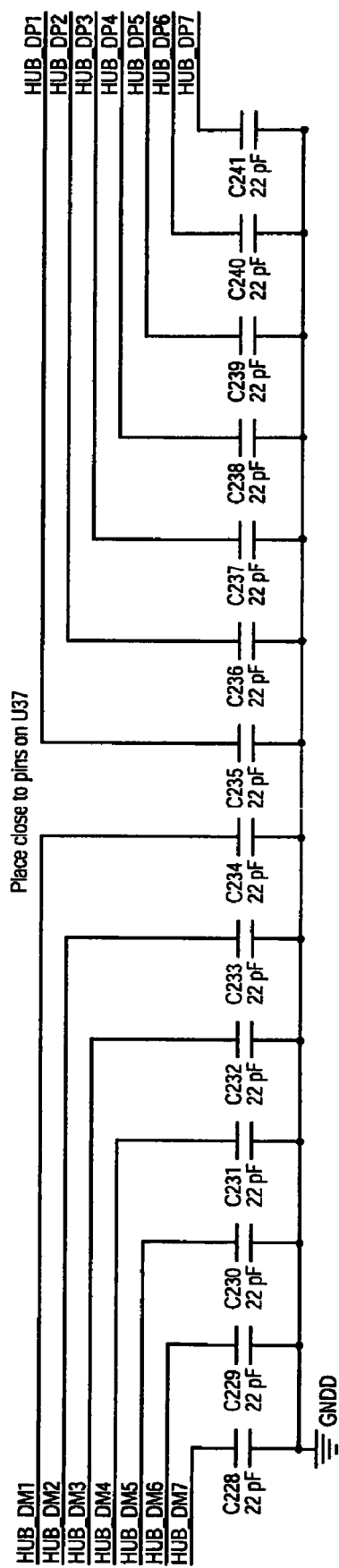
Figure 8:
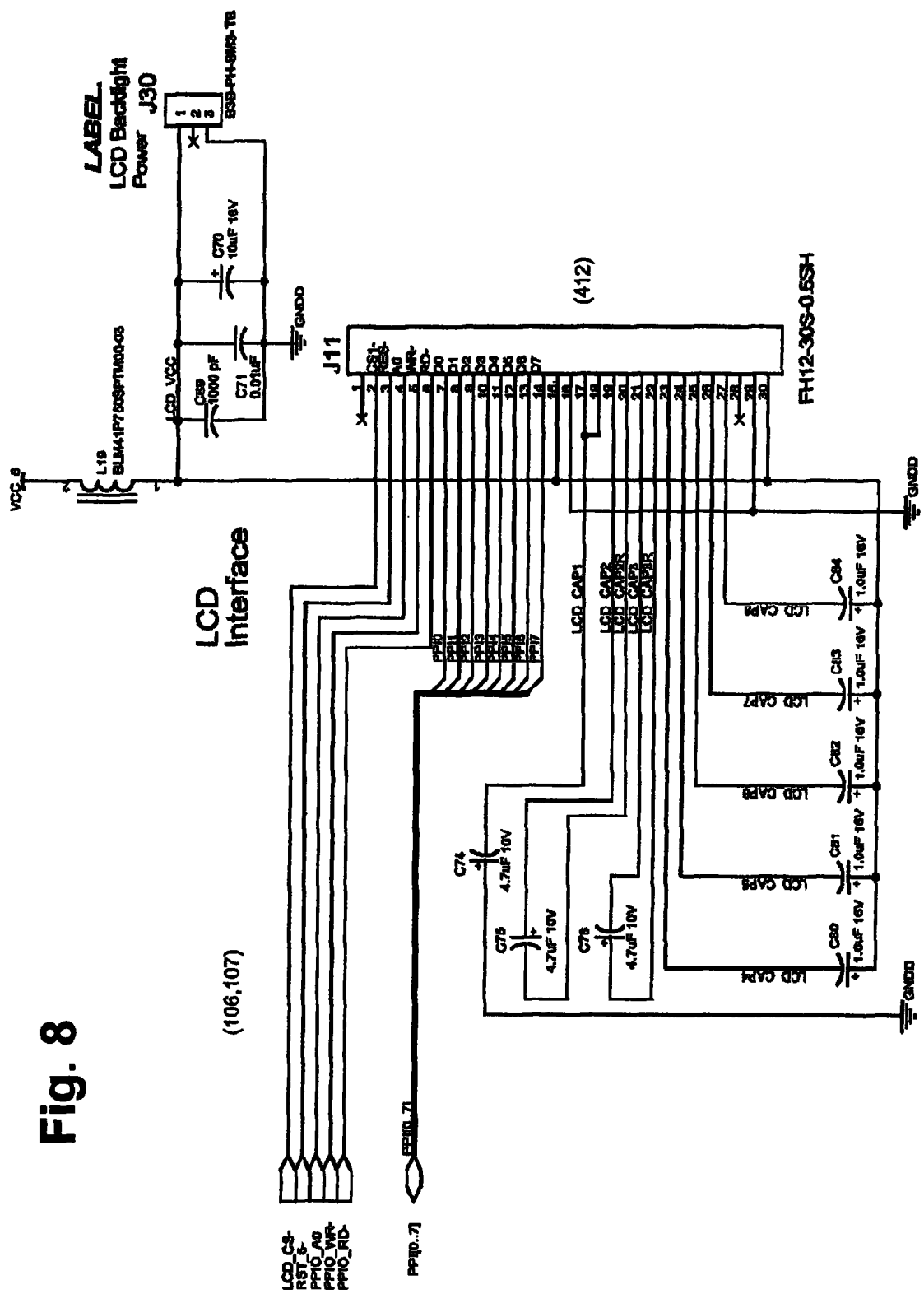

FIGS. 5a and 5b is a schematic diagram of such a processor. Further descriptions an diagrams of such a processor are given in the 78301/T8302 Phone-On A-Chip™ IP Solution" Product Brief, document PN00-0661PT, published March 2000 by Lucent Technologies of Allentown, Pa.

In such a processor the T8301 provides functions such as an audio processing engine for voice compression and decompression, speaker-phone echo cancellation, digital-to-analog and analog-to-digital converters, low-pass filters, and amplifiers to drive standard business-class telephone and speakerphone hardware. Functional descriptions and diagrams of the T8301 telephone DSP are given in the "T8301

Internet Protocol Telephone Phone on a Chip™ IP Solution DSP° Advanced Data Sheet, document DS01-025 IPT, published December 2000 by Lucent Technologies of Allentown, Pa.

The T8302 provides general-purpose functions such as input/output and command processing, for example via Ethernet, USB, infrared devices, etc., and provides general telephone control features such as display control, input switch scanning, LCD and other module interfaces, and the like. Functional descriptions and diagrams of the T8302 processor are given in the "T8302 Internet Protocol Telephone Advanced RISC Machine (ARM)" Data Sheet, document DS01-213 IPT, published July 2001 by Agere Systems, Inc., of Allentown, Pa.

Optionally, processor 412 and/or processing unit 401 comprise memory for use in controlling various functions within the keyboard and devices coupled thereto. For example, processor 412 comprises memory 500 (FIG. 6), coupled to the processor by couplings 501 (FIGS. 5, 6).

Among other functions, processor 412 receives telephony signals from a computer 206, processor 220, or other source, and outputs received signals to an audio circuit comprising one or more speakers 402; and receives signals from a microphone 103, 403 via an audio circuit, and provides them to a computer 206, 220, for delivery to an intended recipient.

A suitable processor 413 for controlling keyboard audio and other functions comprises a DSP1627 Digital Signal Processor available from Lucent Technologies. The DSP1627 is optimized for digital cellular or other packet-switched telephony processes and provides, among other processes, digital-to-analog and analog-to-digital audio signal conversions, for example converting digital audio signals received from a computer coupled to the keyboard (e.g., multi-media sound signals generated by the Microsoft Windows™ operating system) to analog electrical signals for driving one or more speakers 402 coupled to the keyboard. Functional descriptions and diagrams of the DSP1627 processor are given in the "DSP1627 Digital Signal Processor" Data Sheet, document DS00-205 WTEC, published March 2000 by Lucent Technologies of Allentown, Pa.

Optionally, processing unit or processor 401 comprises one or more suitable processors and serves the functions of controller 400 for the key-switch matrix of the keyboard. That is, processor 401 comprises the controller, and is coupled to the switches to perform the controller function of providing signals relating to the state of the switches.

Keyboards according to the invention may provide telephony functions to support any type of computer-supported telephony. For example, in regular IP telephony functions, processor 401 provides for standard addressing (i.e., "dialing"), ringing or other call-received notification functions, and communications functions, using addresses stored locally in the keyboard, in a computer coupled to the keyboard, or in a remote computer coupled to such a computer via a network. For example, a user wishing to place a call picks up handset 104, dials a number using a dialer incorporated within the handset, and the number is provided to processor 401, which translates the dialed number to a network address and sends a call-received (e.g., a "ring") notification to the addressee. Upon receipt by processor 401 of a call-answered indication sent, for example, by the addressee's computer or telephone upon picking up of a corresponding handset or entry of a suitable computer command by the addressee, processor 401 activates handset microphone 403. As the calling user speaks into microphone 403, audio signals produced by microphone 403 are processed by processor 401 into telephony signals and provided to a the user's computer, with an address supplied by processor 401. Upon receipt of telephony signals from the computer, processor 401 provides corresponding audio signals to a handset speaker 402. Replacing handset 104 in handset cradle 105 activates a switch, generating a call terminated signal which is provided to the computer and forwarded to the addressee.

Alternatively, or in addition, keyboards and processors 401 according to the invention may support such telephony functions as "squawk" communications, which are similar to standard telephony, but without some features such as, for example, call-received (or "ringing" functions), and in some cases simplified or abbreviated addressing or dialing functions. In such a case a user is enabled to select a call addressee by, for example, looking up and selecting a user name or addressee from a listing of system users using a virtual "rolodex" or other index feature accessed via display/touchscreen 106 and switches 107, by using up and down arrow buttons 107 or touching corresponding regions on touchscreen/display 106. Address lists accessed by display/touchscreen 106 in displaying address information may be stored in memory located in keyboard 100 or in any computer coupled to the keyboard, either directly or via a network. Upon selection of an address and entry of an execution command entered by the user at the keyboard, as for example by activation of a switch 107 or "SQWK" button 355 in FIG. 3, processor 401 activates a microphone 103 mounted to keyboard 100, and, optionally, an indicator 108, indicating that microphone 103 is active and showing the user its location. When the user speaks into microphone 103, a corresponding audio signal is provided by the microphone to processor 401, which generates a corresponding telephony signal. The generated telephony signal is provided, with a suitable address tag, to the computer and forwarded to the addressee's system, where it is provided to the addressee's processor, converted back into a corresponding audio signal, and provided to a speaker on the addressee's system, optionally without waiting for an acknowledgement or authorization by the addressee. In systems supporting two-way squawk functions, responsive telephony signals provided by the addressee are provided by the computer coupled to the keyboard, converted to corresponding audio signals by processor 401, and provided to speaker(s) 402.

Display 106 comprises a liquid crystal diode (LCD) screen, with touch pad input device or other digitizer and switches 107, programmed or otherwise adapted to provide input, output, and/or control functions for controlling processors 412, 413, and optionally other devices coupled to the keyboard, such as for example key and switch arrays when processor 401 controls the key and switch processes; and any speakers and/or microphones mounted on or otherwise coupled to the display. Display 106 may be programmed and controlled using processor 412 to provide multiple user interface menus for controlling, input to, and/or output from a variety of functions performed by keyboard processors.

Figure 9:
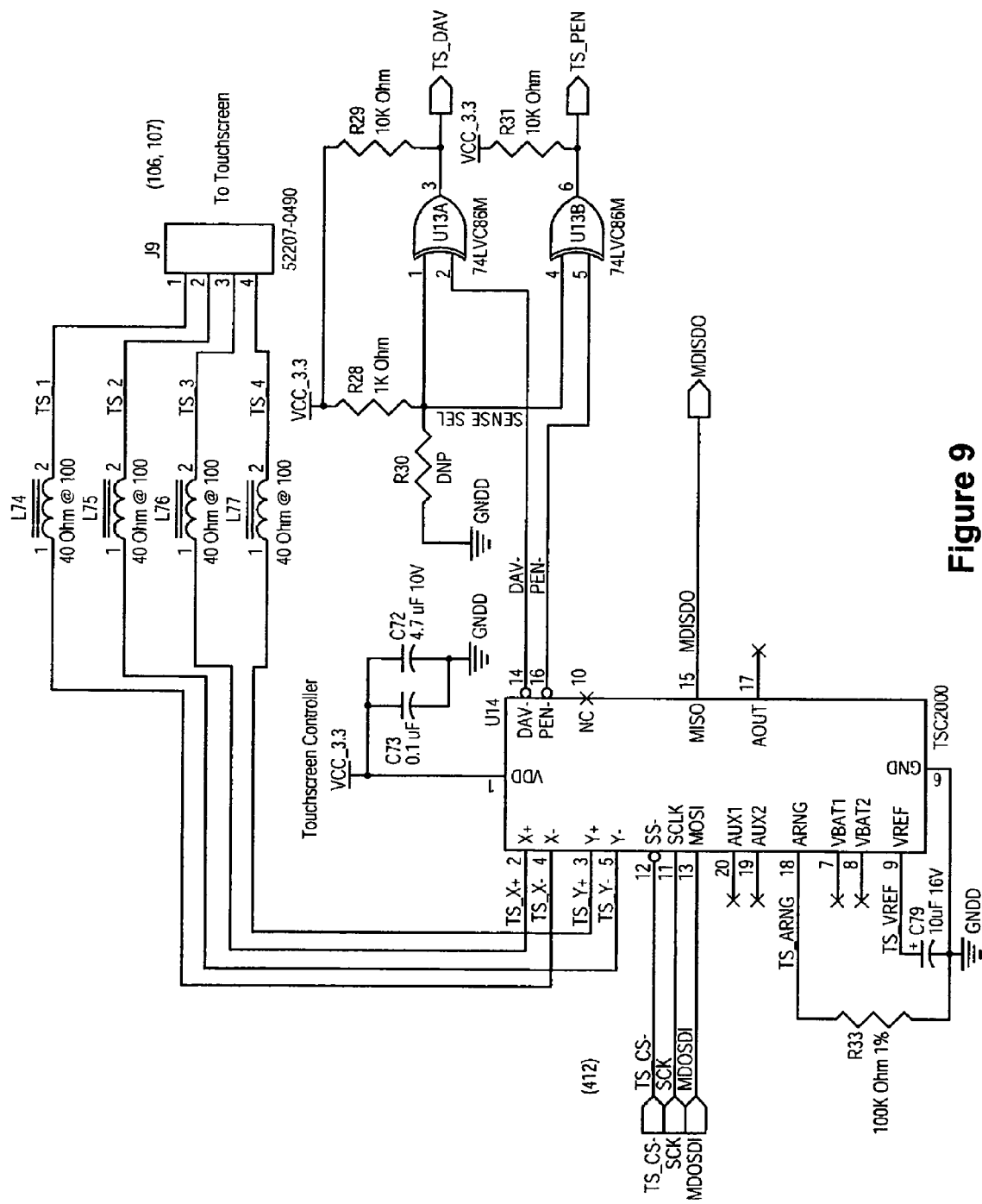
FIG. 9 is a schematic diagram of an embodiment of a display input device interface suitable for implementation in keyboards according to the invention.

A suitable LCD display screen for use with the invention is the F-51320GNY-LY-AA LCD module available from Optrex Corporation, coupled to Gunze 25-138 4-wire resistive touch screen available from Gunze. The LCD screen is described in the Type No. F-5132OGNY-LY-AA LCD Module Technical Specification published 16 Mar. 2001 by Optrex Corporation. Interfaces for LCD display and touchscreen 106 are shown in FIGS. 8 and 9.

USB hub 410 provides input/output and communications pathways for communications between devices mounted to or coupled to keyboard 100, including processor 401 and key and switch arrays 301, 302, 303, and 304. A suitable USB hub for use in keyboards according to the invention is the TUSB2077A 7-Port Universal Serial Bus available from Texas Instruments of Dallas, Tex. This hub is described in the TUSB2077A Data Sheet, document No. SLLS414, published March 2000 by Texas Instruments. FIG. 7 is a schematic diagram of a USB Host interface suitable for use with USB hub 410. USB Host interface 700 comprises couplings 450 for external USB ports, for coupling external devices to keyboard 100, and couplings for external pointing device 112, biometric access device 111, and key switch controller 400.

USB hub 410 also serves as an alternate coupling between an external pointing device such as mouse 212 and a computer coupled to the keyboard 100. External pointing device 212 may also be coupled through coupling 420, including optional autoswitch 421, which provides optional paths for input to keyboard 100 and a computer coupled thereto.

Mixer 404 processes audio signals from processor 401 and, via coupling 422, audio signals provided from a computer coupled to keyboard 100. Mixer 404 mixes audio signals in any desired manner, for example by amplifying one or more sets relative to others, or by interrupting one set during processing of another, or by mixing them as received, without amplification. In some operating modes, as commanded by processor 401, audio signals such as music provided by a computer via coupling 422 are interrupted while audio signals such as telephony signals processed by processor 401 are received from processor 401. Where one or more signal sets are amplified by mixer 404, any desired ratio may be used. In one embodiment it has been found advantageous to mix signals corresponding to telephony signals processed by processor 401 at an amplification of three times that used for audio signals received from a computer via coupling 422.

One or more amplifier(s) 405 may be provided to provide any further desired amplification, such as via speaker volume controls implemented by a user of display 106 and associated switches 107 or a key array such as array 305. Amplifier(s) 405 may be comprised by mixer 404.

Microphones and speakers 103, 104, 403, and 402 are connected via couplings, including optional switches 425 and interrupt switches for interrupting audio signal input/output when external microphones and speakers such as gooseneck devices and/or headsets are coupled to the keyboard 100.

Optionally, a microphone 103 mounted to the keyboard (FIG. 1) is mounted in proximity to a visual indicator device such as a light-emitting diode (LED) controlled by processor 401 for providing a visual indication when audio signals from the microphone will be processed by the processor to provide the at least one function, that is, when the microphone is ready to receive audio input from a user. In addition to providing an indication of microphone and processor readiness, the visual indicator device may be used to provide a convenient locator reference for a user of the microphone. For example, by placing the indicator device close to or at least partially surrounding the microphone, a user may be guided to peaking into the microphone while sending telephony messages.

A suitable microphone for mounting to a keyboard or use in an external stand, according to the invention, is the Omnidirectional Electret Condenser Microphone, WM093413, DB, C, or D, available from Panasonic. Suitable speakers for mounting or external use comprise Card Type speakers WM-R30B and WMR57A and General Speakers EAS4P15SA, EAS45P30S, EAS5P13S, EAS6P22S, EAS8P29SG, EAS8P36S, EAS4D02C0, EAS4D05A, EASG7D504A2, EASG9D550132, EASG9D541A2, and EASG12D531E2, all available from Panasonic.

Figures 1, 10:
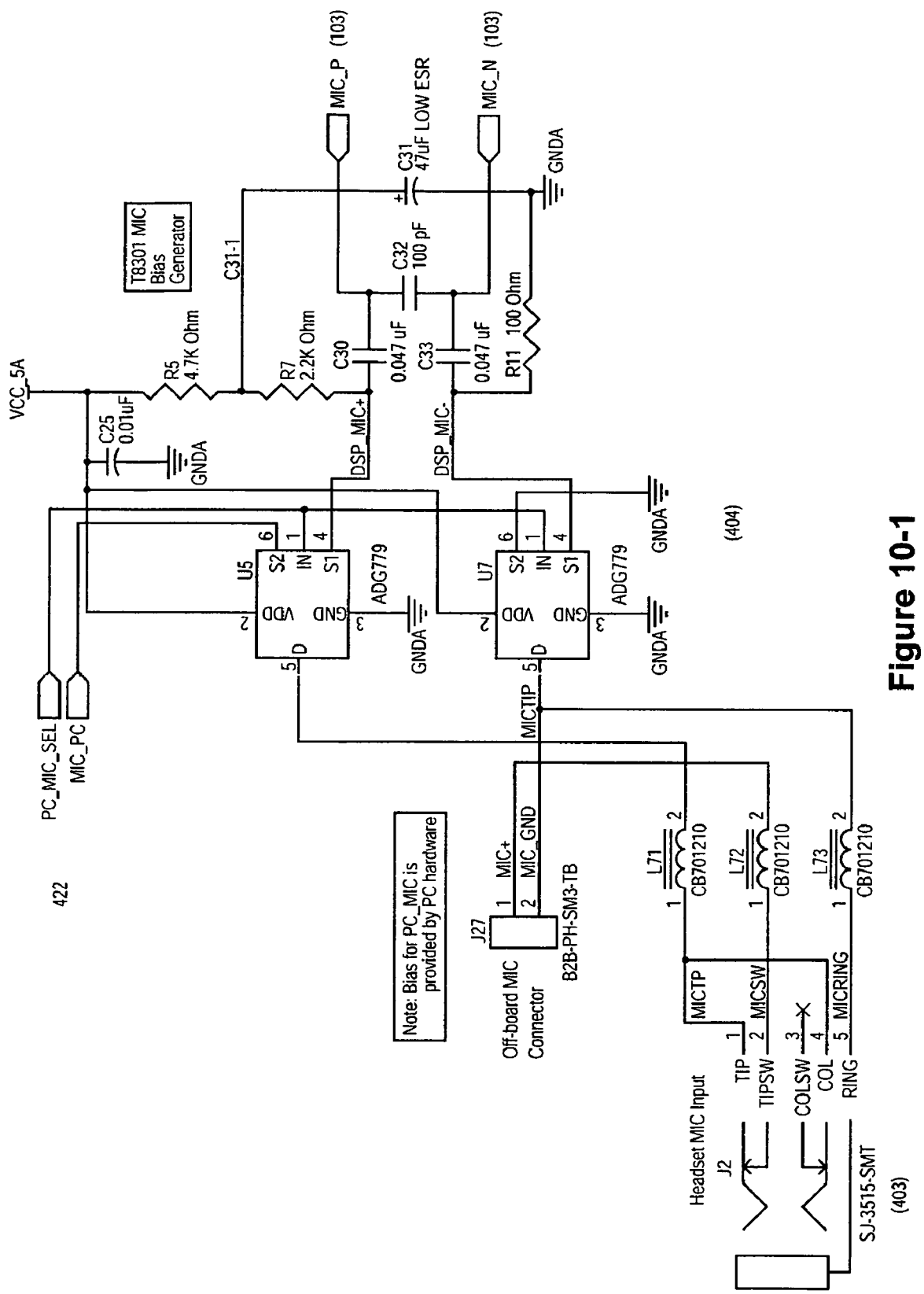
FIG. 10 is a schematic diagram of embodiments of audio mixer, amplifier, and telephone handset interfaces suitable for implementation in keyboards according to the invention.
Figures 2, 10:
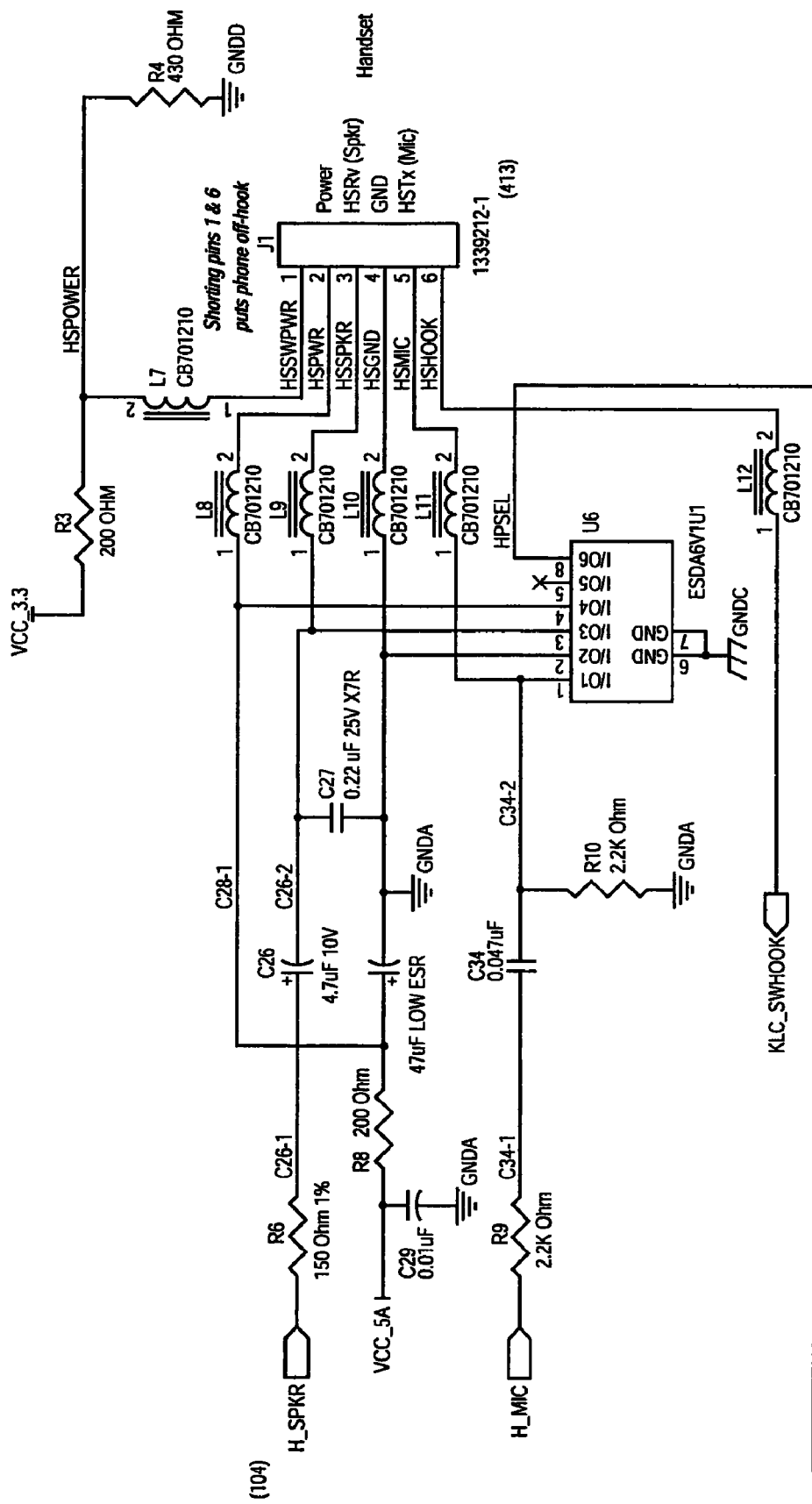
Figures 3, 10:
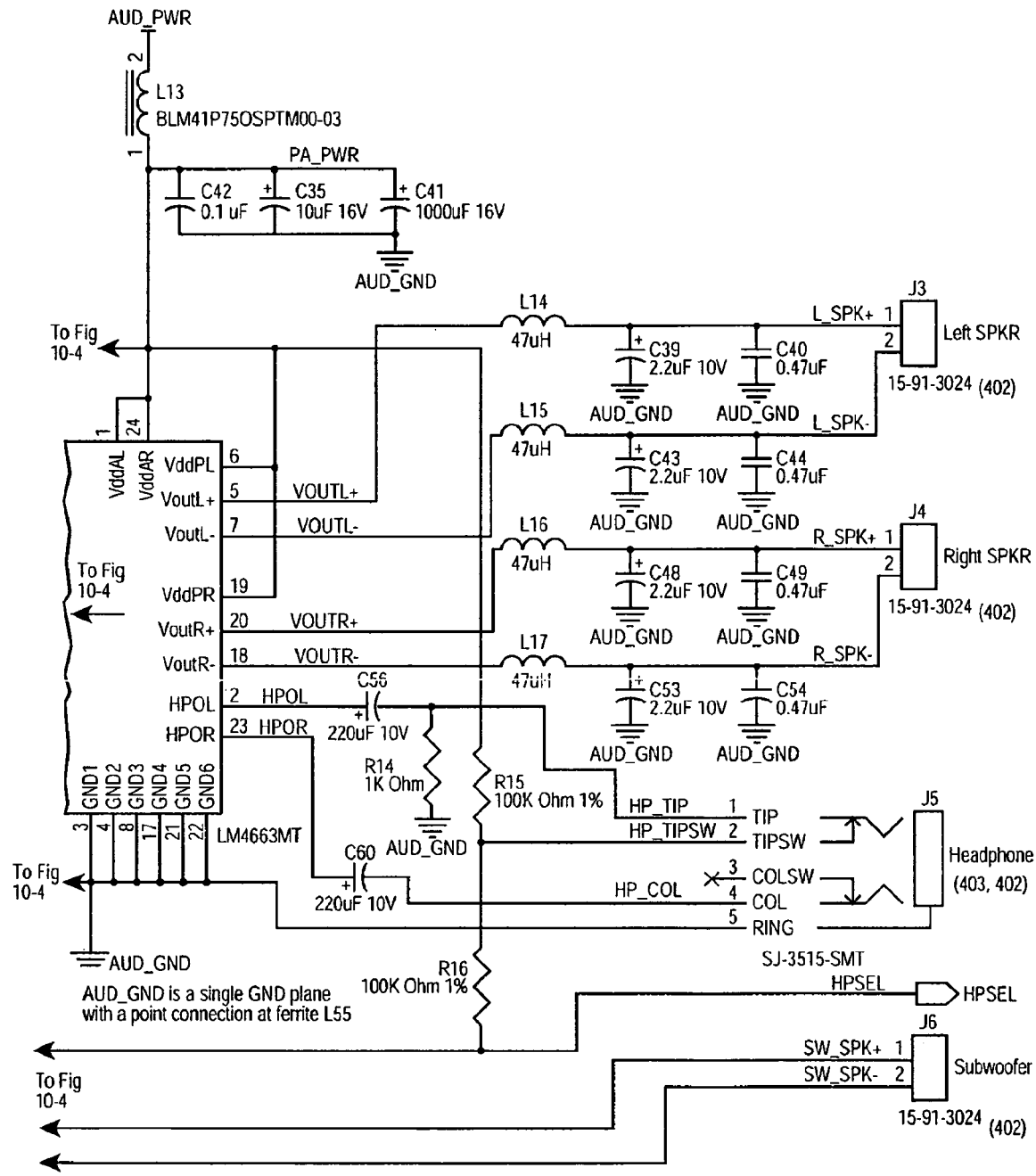
Figures 4, 10:
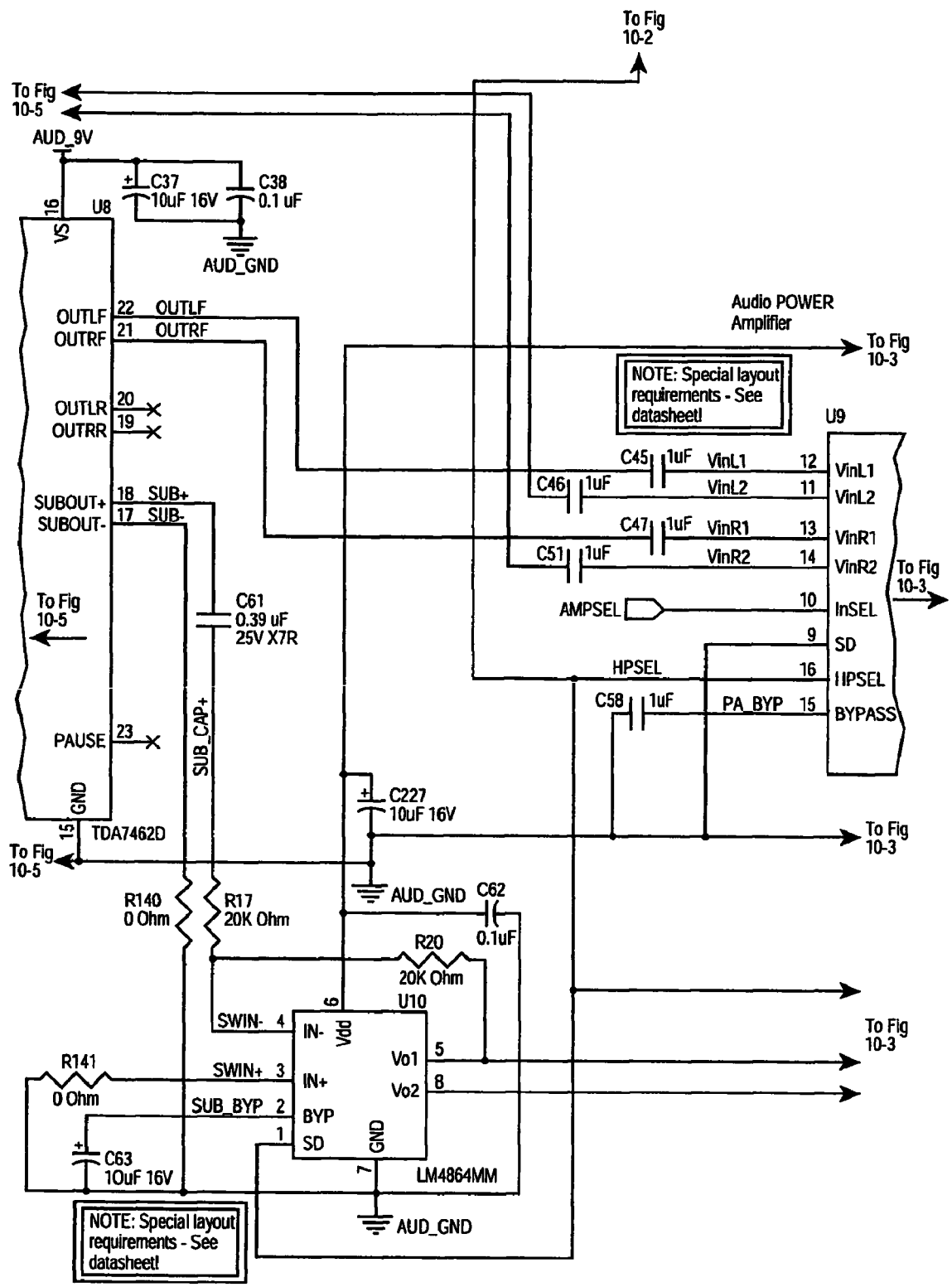
Figures 5, 10:
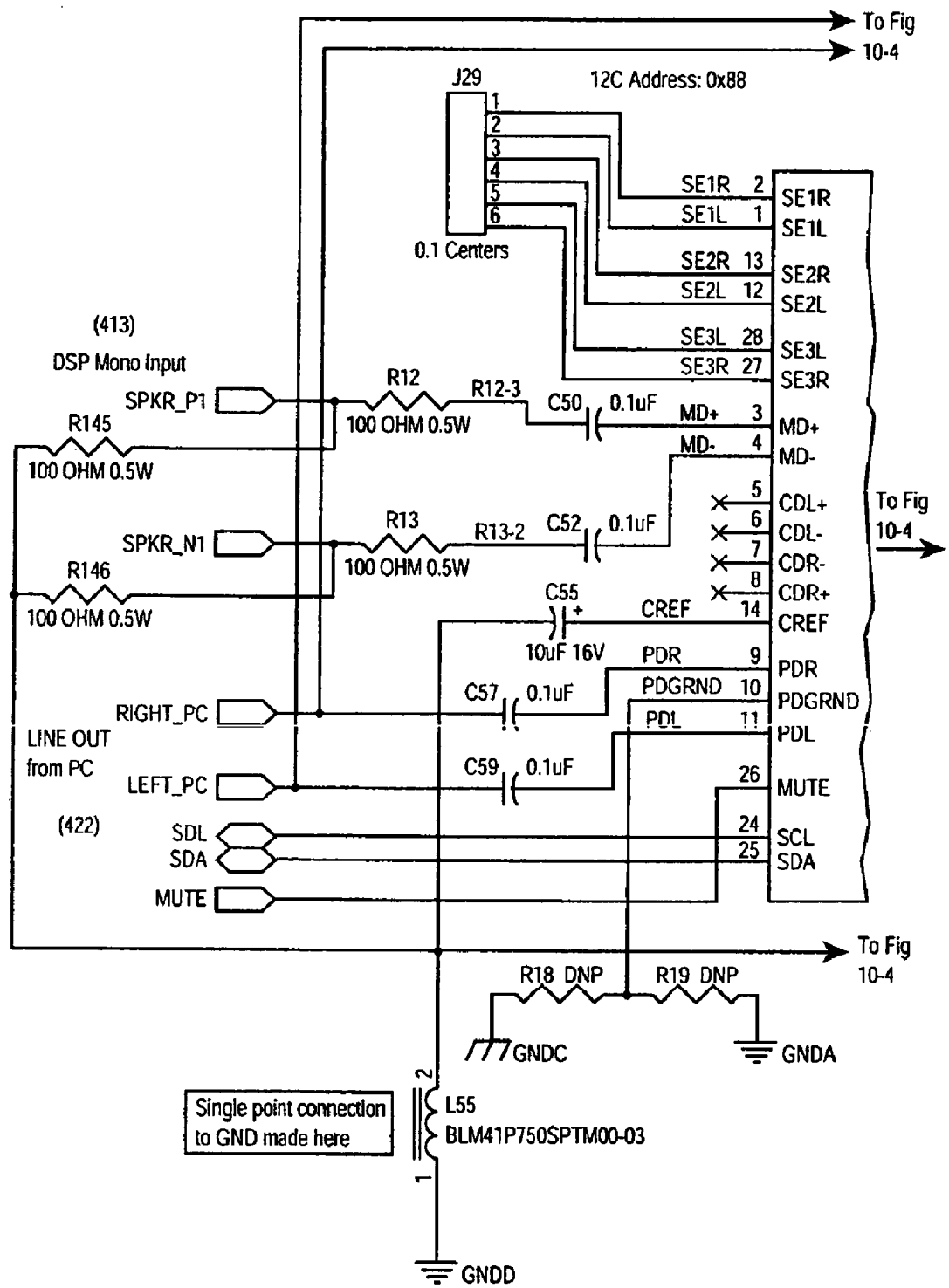

Schematic diagrams of mixer 404, amplifier(s) 405, and an interface for handset 104 are shown in FIG. 10.

Connections 423 for coupling the keyboard to a computer to facilitate data input/output and control functions between the computer and the keyboard may comprise any combination of cables and/or wireless connections suitable for accomplishing the purposes herein. Infrared data reception device (IrdA) 475 is shown schematically in FIG. 4.

Biometric access control device 111, 430 is used to control access to a computer and/or any other devices coupled to keyboard 100. Processes for controlling biometric access device 430, and authorizing access to a computer and/or any other devices by a user of device 430, may be controlled by processor 401 or by any computer accessible by the keyboard, as for example via coupling. 431. An example of a biometric access device suitable for use with the invention is the AES4000 Fingerprint Sensor available from AuthenTec, Inc., of Melbourne, Fla.

The AES4000 comprises a fingerprint-scanning device, including a scanning surface 121 (FIG. 3), which comprises principal axes 122, 123. Principal axis 122 is oriented at an angle 125 of about 65 degrees from edge 124 of keyboard 100, in order to facilitate comfortable and effective scanning of an image of a user's right thumb. During a login process to access a computer coupled to keyboard 100, the user is prompted to place the ball of his/her right thumb on scanning surface 121. Due to the orientation of device 111, 430 on the upper surface of keyboard 100, the user is able to do so in a manner, which promotes fast and effective image scanning, at minimal discomfort and inconvenience to the user.

Keyboard 100 further comprises visual indicator device 126 to display a first indication when access to a computer has been granted to a user based upon a comparison of previously-acquired fingerprint data to data acquired from the user by the fingerprint sampling device, and to display a second indication when said access has been denied. For example, indicator 126 comprises an LED adapted to glow red when access is denied, and green when access is authorized.

Biometric access control device 111 is optionally comprised within a docking unit, or token, removably attachable to keyboard 100, with electrical coupling 465 comprising a serial, parallel, or other suitable electrical connector.

In some embodiments, keyboard 100 comprises one or more portions 140 (FIG. 1) fabricated at least partially from electrically conductive material such as chrome or many other metals, the electrically conductive material being electrically coupled to the biometric sampling device 111 so as to improve an electrical connection between the fingerprint sampling system and at least a portion of a user's body when the user is in contact with the keyboard. For example, in FIG. 3 a surface trimwork at edge 124 of keyboard 100 is coated with or constructed of chrome or other suitable conductor, so that when a user places his/her thumb or other digit on device 111, as for example by laying his/her arm or hand alongside edge 124, with his/her forearm substantially parallel thereto, at least a portion of his/her hand or arm is in contact with portion 140. This electrical contact thus established between the user and device 111 has been found, for example, to improve the efficiency and reliability of access device 111.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied.

In many cases the order of process steps may be varied without changing the purpose, effect, or import of the methods described.

What is claimed is:

1. In a keyboard coupled to a computer, the keyboard including an array of switches and a controller coupled to the switches, to provide to the computer signals relating to the state of the switches, the improvement comprising:
   a biometric sampling device which generates signals relating to scanning of an image by the biometric sampling device;
   a token, the biometric sampling device included within the token, the token being removably attachable to the keyboard so that the biometric sampling device is accessible by a user seeking computer access when the token is attached to the keyboard, wherein when the token is attached to the keyboard, the biometric sampling device is electrically coupled to provide the image-related signals generated by the biometric sampling device for use off the token for authorizing access to a computer.

2. The keyboard of claim 1, wherein the biometric sampling device comprises a fingerprint sampling device.

3. In a keyboard for a computer, the keyboard including an array of switches and a controller coupled to the switches, to provide signals relating to the state of the switches, the improvement comprising:
   a fingerprint sampling system for authorizing access by a user to a computer coupled to the keyboard, the fingerprint sampling system mounted on the keyboard;
   at least a portion of the keyboard comprising an electrically conductive material, the electrically conductive material electrically coupled to the fingerprint sampling device so as to improve an electrical connection between the fingerprint sampling system and at least a portion of a user's body when the user is in contact with the keyboard.

* * * * *